US012681516B2

(12) United States Patent
Zou et al.

(10) Patent No.:  US 12,681,516 B2
(45) Date of Patent:      Jul. 14, 2026

(54) POWER MANAGEMENT TECHNIQUES USING LOCATION-MAPPED CHIPLET CONFIGURATION

(71) Applicant: PowerLattice Technologies Inc., Camas, WA (US)

(72) Inventors: Peng Zou, Camas, WA (US); Gang Ren, Camas, WA (US); Sujith S. Dermal, Chandler, AZ (US)

(73) Assignee: PowerLattice Technologies Inc., Camas, WA (US)

( * ) Notice: Subject to any disclaimer, the term of this patent is extended or adjusted under 35 U.S.C. 154(b) by 81 days.

(21) Appl. No.: 18/981,154

(22) Filed: Dec. 13, 2024

(65) Prior Publication Data

US 2025/0130604 A1      Apr. 24, 2025

Related U.S. Application Data

(63) Continuation-in-part of application No. 18/919,345, filed on Oct. 17, 2024.

(Continued)

(51) Int. Cl.
G05F 1/46          (2006.01)
G06F 1/3215        (2019.01)

(52) U.S. Cl.
CPC ............ G05F 1/468 (2013.01); G06F 1/3215 (2013.01)

(58) Field of Classification Search
CPC ........... G05F 1/468; G06F 1/3215; G06F 1/26
See application file for complete search history.

(56) References Cited

U.S. PATENT DOCUMENTS 5,552,696 A       9/1996  Trainor et al.
7,685,441 B2 *    3/2010  Burton ..................... G06F 1/26
                                                      713/300

(Continued)

FOREIGN PATENT DOCUMENTS

WO       WO2022164498 A1      11/2021
WO       WO2023028398 A1      3/2023

OTHER PUBLICATIONS

PowerLattice Technologies Inc., PCT/US2024/052093, International Search Report and Written Opinion, Dec. 18, 2024, 9 pgs.

(Continued)

*Primary Examiner* — Faisal M Zaman

(74) *Attorney, Agent, or Firm* — Morgan, Lewis & Bockius LLP

(57)          ABSTRACT

This application is directed to an electronic device having a configurable group of voltage regulator cells. The electronic device includes a group of voltage regulator cells operating based on parameter settings of individual voltage regulator cells, output a rail voltage, and provide the rail voltage to multiple power rails. The electronic device includes a memory component coupled to the group of voltage regulator cells. The memory component stores an encoding table including multiple register files, and a register file defines parameter settings for the individual voltage regulator cells of the group of voltage regulator cells. The electronic device includes a setting interface for receiving a parameter setting signal applied to select the register file among the multiple register files for defining the parameter settings for the group of voltage regulator cells. The electronic device includes a substrate where the group of voltage regulator cells and the setting interface are integrated.

20 Claims, 16 Drawing Sheets

Related U.S. Application Data

(60) Provisional application No. 63/610,347, filed on Dec. 14, 2023, provisional application No. 63/592,109, filed on Oct. 20, 2023.

(56) References Cited

U.S. PATENT DOCUMENTS

| | | | |
|---|---|---|---|
| 10,148,173 B1* | 12/2018 | Wang | H02M 3/156 |
| 2003/0006650 A1 | 1/2003 | Tang et al. | |
| 2003/0164498 A1 | 9/2003 | Sung et al. | |
| 2004/0217741 A1 | 11/2004 | Muratov et al. | |
| 2008/0106248 A1* | 5/2008 | Qahouq | G06F 1/26 |
| | | | 323/318 |
| 2009/0039704 A1 | 2/2009 | Chen et al. | |
| 2009/0076778 A1* | 3/2009 | Hsu | G06F 30/367 |
| | | | 703/1 |
| 2011/0087900 A1* | 4/2011 | Lakhanpal | G06F 1/3203 |
| | | | 713/300 |
| 2012/0054515 A1 | 3/2012 | Naffziger et al. | |
| 2014/0107857 A1 | 4/2014 | Yang et al. | |
| 2014/0380070 A1 | 12/2014 | Hua | |
| 2015/0310331 A1* | 10/2015 | Rolston | G06N 5/027 |
| | | | 700/298 |
| 2016/0161962 A1 | 6/2016 | Mathiyalagan et al. | |
| 2018/0234012 A1* | 8/2018 | You | G01R 23/02 |
| 2018/0316218 A1* | 11/2018 | Totten | H02J 1/06 |
| 2020/0233442 A1* | 7/2020 | Miao | G06F 1/26 |
| 2021/0183812 A1 | 6/2021 | Ghosh | |
| 2022/0247314 A1 | 8/2022 | Zou et al. | |
| 2023/0065469 A1 | 3/2023 | Zou et al. | |
| 2024/0014739 A1* | 1/2024 | Pant | G06F 1/26 |

OTHER PUBLICATIONS

PowerLattice Technologies Inc., PCT/US2024/060227, International Search Report and Written Opinion, Feb. 10, 2025, 11 pgs.

PowerLattice Technologies Inc., PCT/US2024/060232, International Search Report and Written Opinion, Feb. 6, 2025, 15 pgs.

PowerLattice Technologies Inc., PCT/US2024/060235, International Search Report and Written Opinion, Feb. 12, 2025, 16 pgs.

* cited by examiner

Processor Chip 212

IO Chip 206

100

202A

Substrate 202

Memory Chip 208

PMIC Chips 204A 204-1

210

204A and 204B:
collectively as 204.

100

Memory Chip 208

204-2

204B

202B 406
(406-1 and 406-2)

Power Plane
416

Inductor 508

Output
Interface
506

Signal
Generator
528

Power
Stage
518

602

720
Inductor 508
A-A'
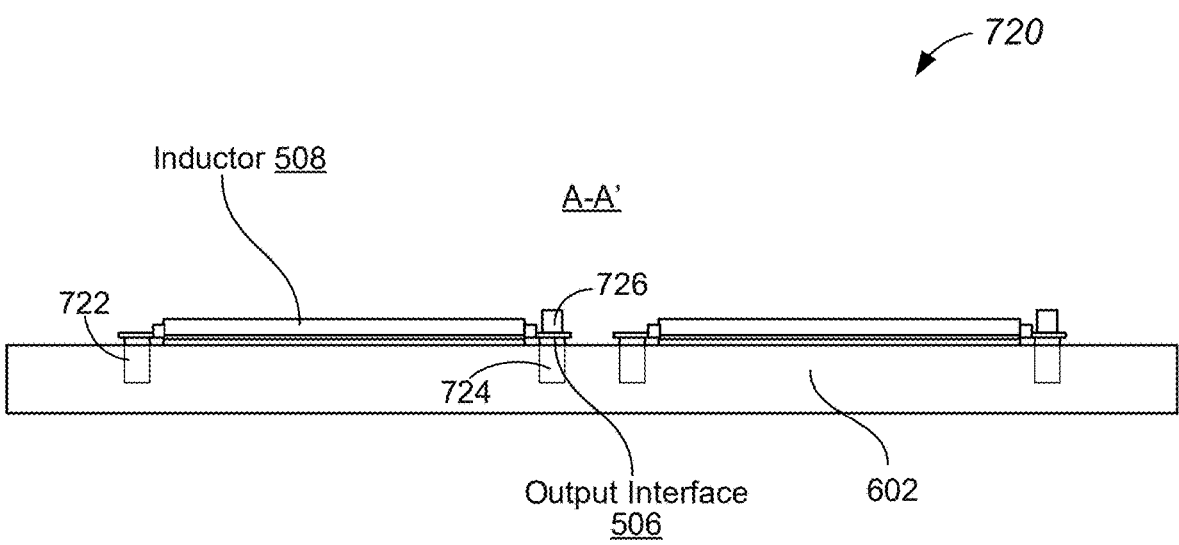
Output Interface
506
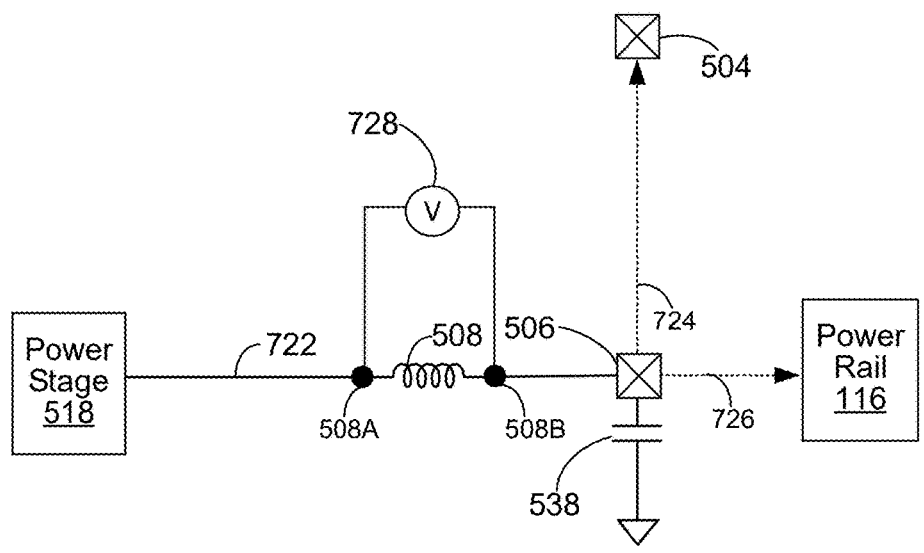
Figure 7B

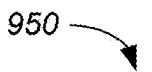
950
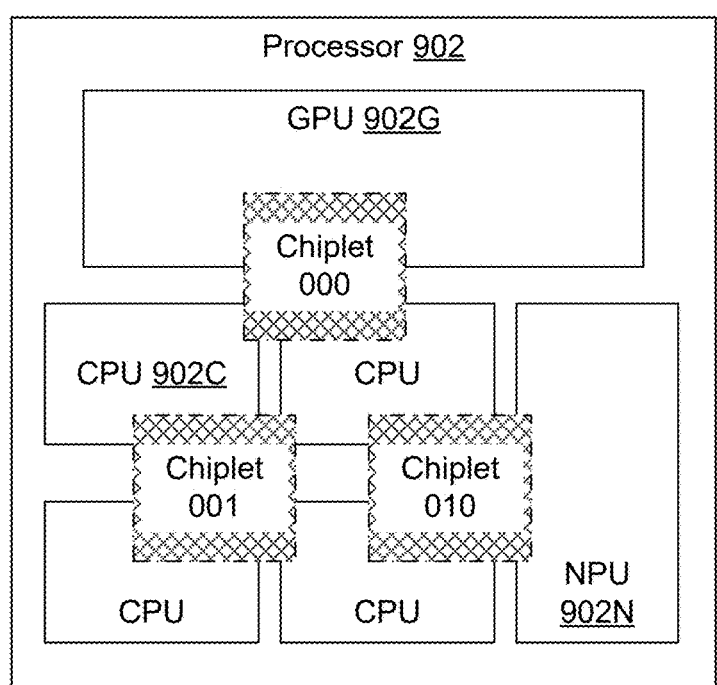
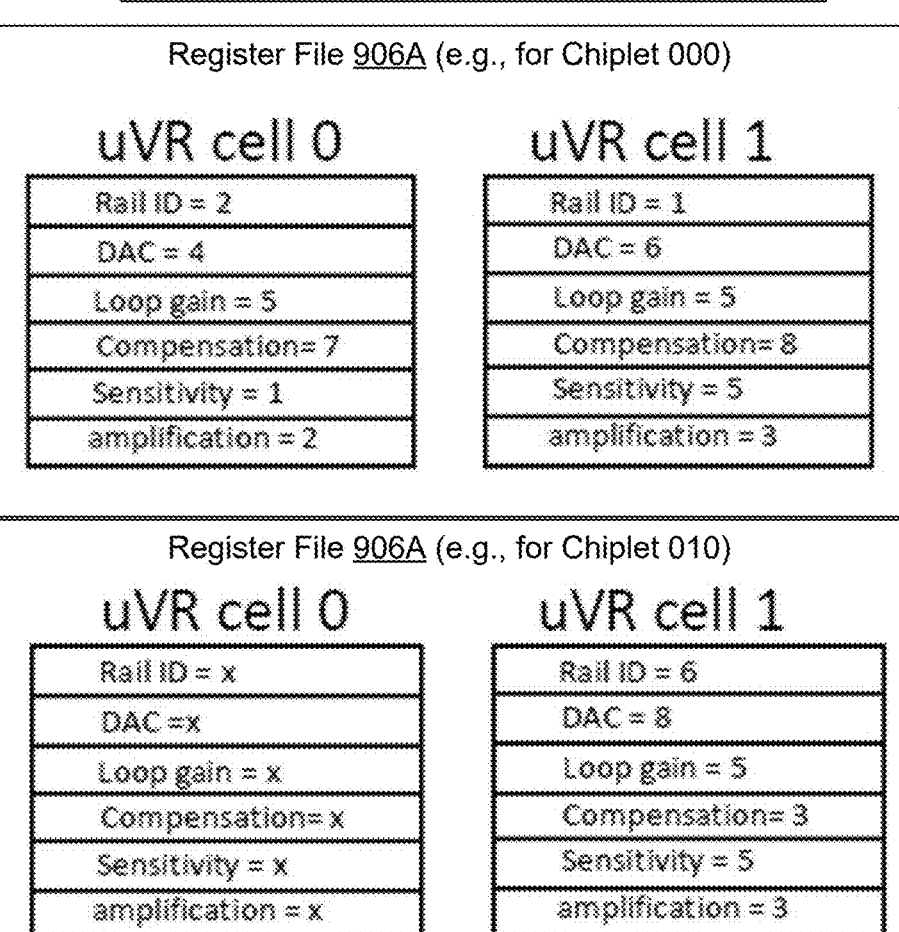
Figure 9B

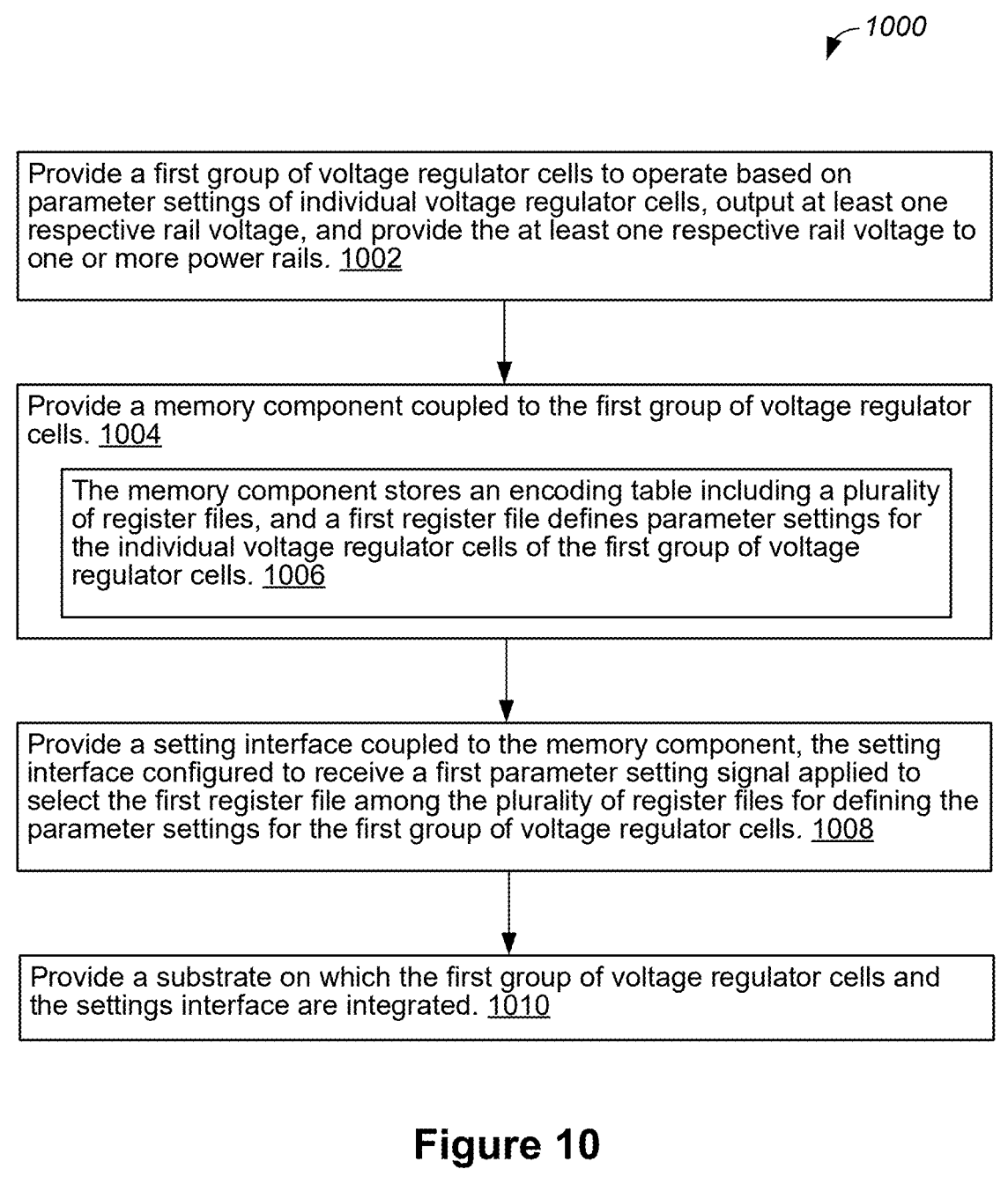

1000

Provide a first group of voltage regulator cells to operate based on parameter settings of individual voltage regulator cells, output at least one respective rail voltage, and provide the at least one respective rail voltage to one or more power rails. 1002

Provide a memory component coupled to the first group of voltage regulator cells. 1004

> The memory component stores an encoding table including a plurality of register files, and a first register file defines parameter settings for the individual voltage regulator cells of the first group of voltage regulator cells. 1006

Provide a setting interface coupled to the memory component, the setting interface configured to receive a first parameter setting signal applied to select the first register file among the plurality of register files for defining the parameter settings for the first group of voltage regulator cells. 1008

Provide a substrate on which the first group of voltage regulator cells and the settings interface are integrated. 1010

Figure 10

POWER MANAGEMENT TECHNIQUES USING LOCATION-MAPPED CHIPLET CONFIGURATION

RELATED APPLICATION

This application claims benefit of U.S. Provisional Patent Application No. 63/610,347, titled "Apparatus of Configurable PMIC with Array of Micro Integrated Voltage regulator cells and Shared Programmable References," filed Dec. 14, 2023, which is incorporated by reference in its entirety.

This application is a continuation-in-part of, and claims priority to, U.S. application Ser. No. 18/919,345, titled "Apparatus of Configurable PMIC with Array of Micro Integrated Voltage regulator cells and Shared Programmable References," filed Oct. 17, 2024, which claims benefit of U.S. Provisional Patent Application No. 63/592,109, titled "Apparatus of Configurable PMIC with Array of Micro Integrated Voltage regulator cells and Shared Programmable References," filed Oct. 20, 2023. Each of these patent applications is incorporated by reference in its entirety.

This application also relates to International Patent Application No. PCT/US24/52093, titled "Apparatus of Configurable PMIC with Array of Micro Integrated Voltage regulator cells and Shared Programmable References," filed Oct. 17, 2024, which is incorporated by reference in its entirety.

TECHNICAL FIELD

This application relates generally to power management of an electronic system, including, but not limited to, methods, systems, devices, and integrated circuits for configuring sets of voltage regulator cells applied in a power management integrated circuit (PMIC) that is coupled to, or included in, a system on chip (SoC).

BACKGROUND

A system on chip (SoC) consolidates multiple components of a computer, such as a processor, memory, input/output interfaces, and various peripherals, on a substrate. SoCs are widely used in modern electronics, including smartphones, tablets, and embedded systems, where space, power efficiency, and performance are critical. To manage complex power requirements of these components, a Power Management Integrated Circuit (PMIC) is employed. The PMIC is responsible for regulating, distributing, and controlling the power delivered to the SoC's various subsystems. It efficiently manages multiple voltage levels, enabling features like dynamic voltage scaling to conserve energy and ensure the SoC operates within its optimal power and thermal limits. The SoC and PMIC form a highly efficient system capable of handling diverse tasks with minimal power consumption, making them essential in today's compact, high-performance devices. However, the PMIC applied with the SoC may face some issues with consistency among different power rails and stability within a single power rail. Consistency issues arise when different power rails fail to deliver uniform voltage levels or fail to sequence properly, leading to performance variations or even malfunctions in the SoC. This can be caused by mismatched regulation circuitry, differing load demands, or poor coordination between multiple power rails. Stability issues, on the other hand, affect individual power rails where voltage fluctuations, oscillations, or noise occur within a single rail.

These problems can cause intermittent failures, timing errors, or degraded performance in the SoC.

SUMMARY

In accordance with at least some implementations disclosed herein is at least the realization that an SoC requires consistent and reliable power delivery on its power rails. A particular challenge of driving a power rail with a set of voltage regulator cells (e.g., on an SoC) is load current balancing among different voltage regulator cells. Each respective cell often includes its own control loop. If each respective cell uses a different reference voltage source (e.g., DAC), output voltages of the different voltage regulator cells can have small but substantive differences. Output reference voltages provided by two DACs based on the same code are highly unlikely to be exactly the same, causing their associated voltage regulator cells to have inconsistent output voltages and a load current imbalance. At the extreme situation of poor current balancing, a power rail driven by a set of voltage regulator cells can malfunction and get permanently damaged. As such, in accordance with at least some implementations disclosed herein is at least the realization that each power rail delivers its rail voltage consistently and that different power rails providing the same rail voltage need to be consistent with one another.

Various implementations of this application are directed to methods, systems, devices, and integrated circuits for generating one or more rail voltages to power a plurality of power rails using a configurable power management integrated circuit (PMIC), where the PMIC includes an array of micro-integrated voltage regulator cells configured to operate with location-based parameter settings. A subset of voltage regulator cells may be selected and grouped to function as a power supply driving a power rail. The PMIC may apply one or more consolidated reference circuits, and the selected voltage regulator cells associated with the power supply are driven by the same reference circuit. In some implementations, the voltage regulator cells of the PMIC are grouped to form a plurality of power supplies, e.g., each of which outputs a programmable rail voltage, and a subset of voltage regulator cells corresponding to each respective power supply is driven by a respective common reference circuit. In some embodiments, voltage regulator cells of the PMIC operate based on an encoding table including a plurality of register files corresponding to different groups of voltage regulator cells having different locations (e.g., in an SoC). Each register file defines parameter settings for individual voltage regulator cells of a respective group of voltage regulator cells based on a common location of the respective group. In some embodiments, the PMIC stores a plurality of table options corresponding to different SoC products, and the encoding table of a particular SoC product is selected from the plurality of table options.

In one aspect, an electronic device includes a first group of voltage regulator cells configured to operate based on parameter settings of individual voltage regulator cells, output at least one respective rail voltage, and provide the at least one respective rail voltage to the one or more power rails. The electronic device includes a memory component coupled to the first group of voltage regulator cells, where the memory component stores an encoding table including a plurality of register files, and a first register file defines parameter settings for the individual voltage regulator cells of the first group of voltage regulator cells. The electronic device includes a setting interface coupled to the memory component. The setting interface configured to receive a first parameter setting signal applied to select the first register file among the plurality of register files for defining the parameter settings for the first group of voltage regulator cells. The electronic device includes a substrate on which the first group of voltage regulator cells and the settings interface are integrated.

In another aspect, an apparatus (e.g., an electronic system, an electronic device, integrated circuit) includes a first group of voltage regulator cells configured to operate based on parameter settings of individual voltage regulator cells, output at least one respective rail voltage, and provide the at least one respective rail voltage to one or more power rails. The apparatus includes a memory component coupled to the first group of voltage regulator cells, where the memory component stores an encoding table including a plurality of register files, and a first register file defines parameter settings for the individual voltage regulator cells of the first group of voltage regulator cells. The apparatus includes a setting interface coupled to the memory component. The setting interface is configured to receive a first parameter setting signal applied to select the first register file among the plurality of register files for defining the parameter settings for the first group of voltage regulator cells. The apparatus includes a substrate on which the first group of voltage regulator cells, the setting interface, and the memory component are integrated.

In yet another aspect, a method is implemented to provide an apparatus (e.g., an electronic system, an electronic device, an integrated circuit). The method includes providing a first group of voltage regulator cells that are configured to operate based on parameter settings of individual voltage regulator cells, output at least one respective rail voltage, and provide the at least one respective rail voltage to one or more power rails. The method further includes providing a memory component coupled to the first group of voltage regulator cells. The memory component stores an encoding table including a plurality of register files, and a first register file defines the parameter settings for the individual voltage regulator cells of the first group of voltage regulator cells. The method further includes providing a setting interface coupled to the memory component, and the settings interface is configured to receive a first parameter setting signal applied to select the first register file among the plurality of register files for defining the parameter settings for the first group of regulator cells. The method further includes integrating the first group of voltage regulator cells, the settings interface, and the memory component on a substrate.

In yet another aspect, a method is implemented to manage power of an electronic device having a substrate, a memory component, a setting interface, and a plurality of voltage regulator cells. The method includes obtaining a first parameter setting signal via the setting interface. The method further includes, based on the first parameter setting signal, selecting a first register file from a plurality of register files of an encoding table stored on the memory component. The first register file defines parameter settings for the individual voltage regulator cells of a first group of voltage regulator cells. The method further includes identifying and setting the first group of voltage regulator cells based on the parameter settings defined by the first register file and outputting at least one respective rail voltage by the first group of voltage regulator cells to drive one or more power rails. The first group of voltage regulator cells and the settings interface are integrated on a substrate.

These illustrative implementations and implementations are mentioned not to limit or define the disclosure, but to provide examples to aid understanding thereof. Additional implementations are discussed in the Detailed Description, and further description is provided there.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

FIGS. 7B and 7C are two cross sectional views of a portion of the PMIC chip shown in FIG. 7A including two inductors of two voltage regulator cells, in accordance with some implementations.

FIGS. 9A and 9B illustrate example chiplets of a PMIC module and associated location-based parameter settings, in accordance with some implementations.

FIG. 10 is a flow diagram of an example method for providing a PMIC module including an array of voltage regulator cells, in accordance with some implementations.

Like reference numerals refer to corresponding parts throughout the several views of the drawings.

DETAILED DESCRIPTION

Figure 1:
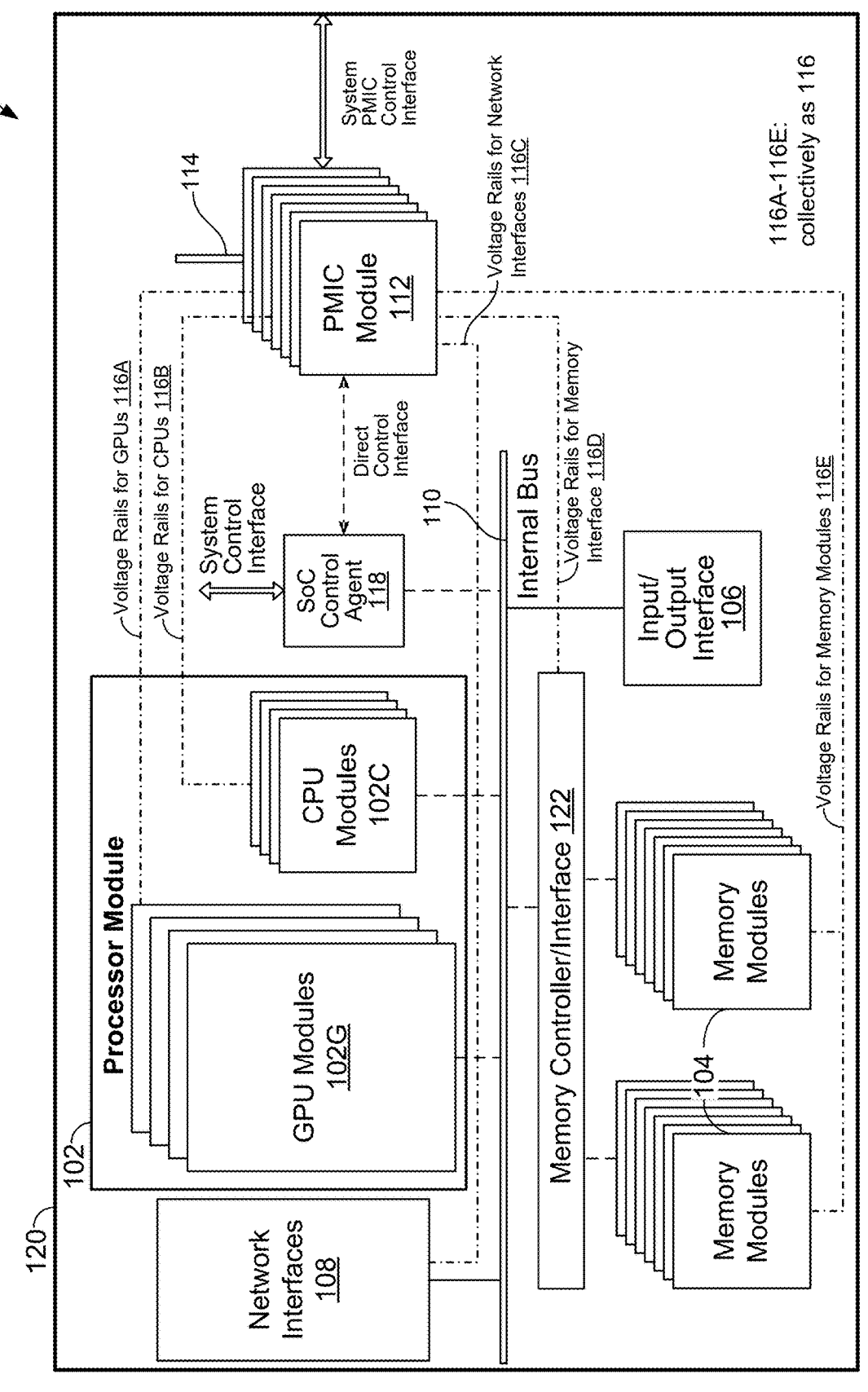
FIG. 1 is a block diagram of an example electronic system, in accordance with some implementations.

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with storage capabilities.

In accordance with at least some implementations disclosed herein is the realization that an SoC requires consistent and reliable power delivery on its power rails. Each power rail delivers its rail voltage consistently, and different power rails providing the same rail voltage may need to be consistent with one another. Various implementations of this application are directed to methods, systems, devices, and integrated circuits for generating one or more rail voltages to power a plurality of power rails using a configurable power management integrated circuit (PMIC) that applies one or more consolidated reference circuits. The configurable PMIC includes an array of micro-integrated voltage regulator cells. A subset of voltage regulator cells may be selected and grouped to function as a power supply driving a power rail. The selected voltage regulator cells are driven by the same reference circuit In some implementations, the voltage regulator cells of the PMIC are grouped to form a plurality of power supplies, e.g., each of which outputs a programmable rail voltage, and a subset of voltage regulator cells corresponding to each respective power supply is driven by a respective common reference circuit.

In accordance with at least some implementations disclosed herein is the realization that a challenge of grouping a set of voltage regulator cells is load current balancing (or sharing) among the voltage regulator cells when each voltage regulator cell has a respective regulation control loop. Stated another way, two voltage regulator cells provide different output voltages and experience a load current imbalance, potentially causing a power rail coupled to these two voltage regulator cells to malfunction and permanently damage electronic components powered by the power rail.

To overcome this issue, a reference circuit is shared among a set of voltage regulator cells coupled to the same power rail. An output voltage of each voltage regulator cell tracks a respective reference voltage provided by the shared reference circuit. In some implementations, a digital-to-analog converter (DAC) provides a reference voltage that may drift based on varied factors (e.g., locations, manufacturing conditions), even when the DAC is programmed using fixed digital input data. When the DAC is applied within a reference voltage source driving multiple voltage regulator cells coupled to the same power rail, the reference voltage drift jointly for the voltage regulator cells coupled to the same power rail, thereby making these voltage regulator cells perform consistently and stay in balance with one another. In some implementations, an array of DACs is coupled to a reference voltage distribution bus and a switch array, and configured to provide a common voltage reference to a set of voltage regulator cells that output the same rail voltage. Each voltage regulator cell does not have its self-contained DAC, thereby eliminating a current imbalance issue due to differences among self-contained DACs.

FIG. 1 is a block diagram of an example electronic system 100, in accordance with some implementations. The electronic system 100 includes at least a processor module 102, memory modules 104, an input/output (I/O) interface 106, one or more communication interfaces such as network interfaces 108, and one or more communication buses 110 for interconnecting these components. In some implementations, the I/O interface 106 allows the processor module 102 to communicate with an I/O device (e.g., a keyboard, a mouse, or a trackpad). The I/O interface 106 may comply with a data communication bus standard including, but not limited to, universal serial bus (USB) and peripheral component interconnect express (PCIe). In some implementations, the communication bus(es) 110 include circuitry (sometimes called a chipset) that interconnects and controls communications among various system components included in electronic system 100. In some implementations, the electronic system 100 further includes other specialized hardware (e.g., wireless radios, graphics card, sound card, sensors).

In some implementations, the electronic system 100 further includes a PMIC module 112 configured to receive an input supply voltage 114. The PMIC module 112 is configured to modulate the received input supply voltage 114 to desired DC voltage levels (e.g., 5 V, 3.3 V or 1.8 V) as required by various components or circuits (e.g., the processor module 102) within the electronic system 100. For example, the PMIC module 112 is configured to generate the DC voltage levels at a plurality of power rails 116 for providing power to other components (e.g., components 102-110) in the electronic system 100. Examples of the plurality of power rails 116 include, but are not limited to: one or more GPU power rails 116A, one or more CPU power rails 116B, one or more networking power rails 116C, one or more memory interface power rails 116D, and one or more memory module power rails 116E. In some implementations, the PMIC module 112 further includes a layer within a printed circuit board (PCB) or an integrated circuit (IC), and the layer is applied as an input power plane for distributing the input supply voltage 114.

In some implementations, the electronic system 100 corresponds to an SoC 120. Different components of the electronic system 100 may be formed on two or more integrated circuits distributed on two or more chips, which are further assembled on a single substrate (e.g., substrate 202 in FIG. 2A) of the SoC 120. Alternatively, in some implementations, different components of the electronic system 100 are included in an integrated circuit formed on a single substrate of the SoC 120. In an example, the SoC 120 includes one of a silicon substrate, a polymeric substrate, a glass substrate, or a printed circuit board (PCB). Examples of the polymeric substrate include, but are not limited to, polyimide (PI), polyethylene terephthalate (PET), and polydimethylsiloxane (PDMS).

In some implementations, the SoC 120 further includes an SoC control agent 118 that refers to a control mechanism or module within the SoC 120. The SoC control agent 118 is configured to manage operation of different components (e.g., components 102-110) integrated on the SoC 120. More specifically, in some implementations, the SoC control agent 118 is configured to perform one or more of: resource management, inter-component communication, power management, task scheduling, security management, thermal management. For example, the SoC control agent 118 may allocate resources like power, processing time, and memory bandwidth to different components of the SoC 120; manages communication between various components, such as coordinating data transfers between the processor module 102 and peripherals; turn off or put certain components into a low-power state when they are not in use to conserve energy; manage scheduling of different tasks or operations across processing units of the processor module 102 within the SoC 120; implements security features (e.g., using hardware security modules, encryption, and access control); or monitor temperature sensors and adjusts operation (e.g., reducing clock speeds) to prevent overheating. In an example, the SoC control agent 118 includes one or more of: a power controller, a bus controller, and a clock controller. In some implementations, the SoC control agent 118 is implemented on a firmware level, e.g., adjusting system parameters dynamically based on workloads or external conditions.

In some implementations, the processor module 102 includes a plurality of processing units. In some implementations, the processor module 102 includes two or more different types of processing units including a subset of: one or more central processing units (CPUs) 102C, one or more graphics processing units (GPU) 102G, a digital signal processor (DSP), a neural processing unit (NPU) (also called artificial intelligence (AI) accelerator), an image signal processors (ISP), a video processing unit (VPU), an audio processing unit (APU), a secure microcontroller, and a field programmable gate array (FPGA). The CPUs 102C are configured to execute instructions from software (e.g., operating systems, applications). Examples of CPU architecture include, but are not limited to, reduced instruction set computing (RISC) and complex instruction set computing (CIS). The GPUs 102G are configured to render graphics and handle tasks that require parallel processing, such as image processing, video encoding/decoding, and machine learning.

In some implementations, the network interfaces 108 is configured to enable communication between the SoC 120 and external networks, such as local area networks (LANs) or the Internet, and includes both hardware and software components that handle data transmission, reception, and protocol management. The network interfaces 108 may include one or more interfaces for Wi-Fi, Ethernet, and Bluetooth networks, each allowing the electronic system 100 to exchange data with an external source, and participate in networked applications, such as IoT (Internet of Things), mobile communications, or cloud computing.

In some implementations, the memory modules 104 include high-speed random-access memory, such as static random-access memory (SRAM), double data rate (DDR) dynamic random-access memory (DRAM), or other random-access solid state memory devices. In some implementations, the memory modules 104 include non-volatile memory, such as one or more magnetic disk storage devices, optical disk storage devices, flash memory devices, or other non-volatile solid state storage devices. In some implementations, the memory modules 104, or alternatively the non-volatile memory device(s) within the memory modules 104, include a non-transitory computer readable storage medium. In an example, a memory module 104 includes a high bandwidth memory (HBM) configured to provide a data bandwidth greater than a bandwidth threshold to support GPUs 102G. The HBM includes a plurality of memory dies that are stacked vertically on top of each other. In some implementations, the electronic system 100 further includes a memory controller 122 coupled to manage memory access requests for the memory modules 104.

Figure 2A:
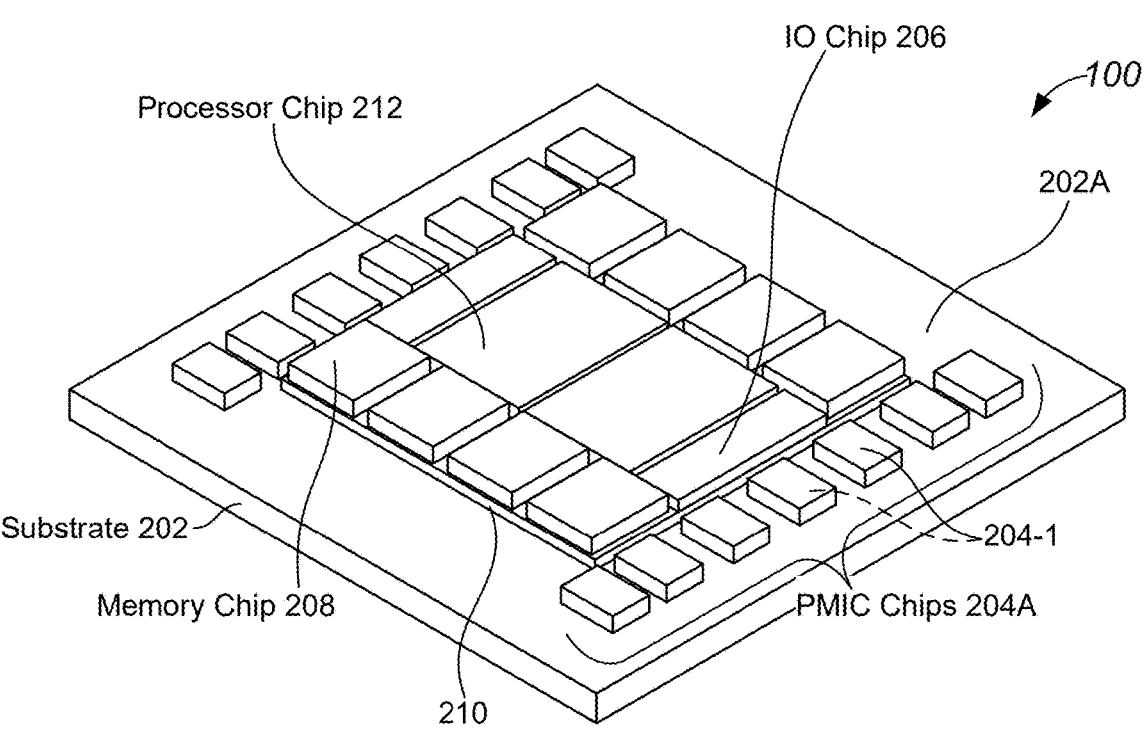
FIGS. 2A and 2B are a top perspective view and a bottom perspective view of an example electronic system including an SoC, in accordance with some implementations, respectively.
Figure 2B:
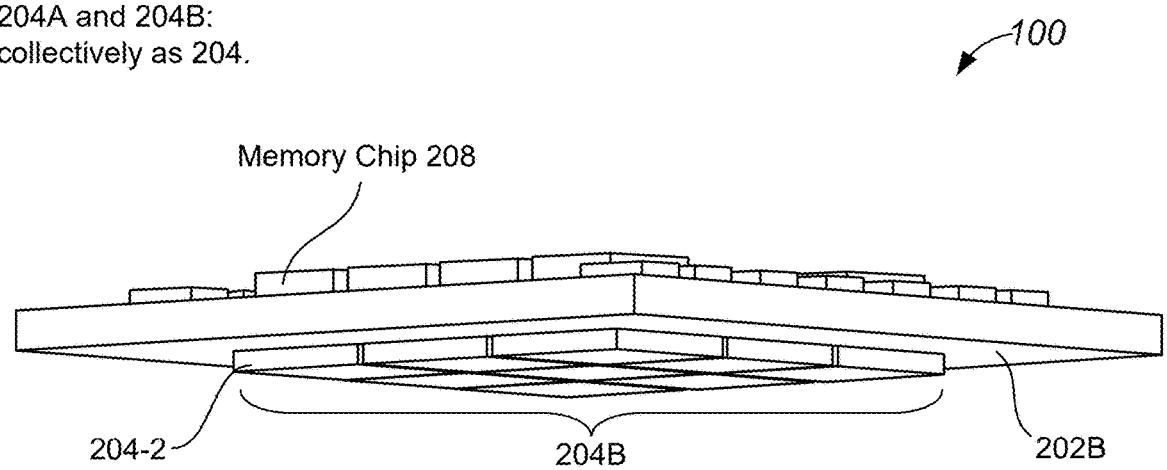

FIGS. 2A and 2B are a top perspective view and a bottom perspective view of an example electronic system 100, in accordance with some implementations, respectively. The electronic system 100 includes an SoC 120 having a substrate 202. The substrate 202 includes a first surface 202A and a second surface 202B that is opposite to the first surface 202A. The substrate 202 may be one of a silicon substrate, a polymeric substrate, a glass substrate, or a PCB. Examples of the polymeric substrate include, but are not limited to, PI, PET, and PDMS. In some implementations, each electronic component of the electronic system 100 corresponds to a region of the substrate 202, and includes a portion of an integrated circuit of the SoC 120. Alternatively, in some implementations, each electronic component of the electronic system 100 includes one or more chips that are mounted onto the substrate 202, e.g., with or without an intermediate support structure 210. In an example, the substrate 202 is made of a polymeric material, and the intermediate support structure 210 is made of silicon and applied to mechanically support a plurality of components (e.g., including an IO chip 206, a memory chip 208, a processor chip 212).

In some implementations not shown, all electronic components included in the electronic system 100 are disposed on the first surface 202A of the substrate 202. Alternatively, in some implementations, a first subset of electronic components of the electronic system 100 are disposed on the first substrate 202A of the substrate 202, and a second subset of electronic components of the electronic system 100 are disposed on the second substrate 202B of the substrate 202. In an example, one or more chips corresponding to a subset of the electronic components 102-108, 118, and 122 are disposed on the second surface 202B. In another example, one or more chips corresponding to the PMIC module 112 are disposed on the second surface 202B.

In some implementations, the PMIC module 112 includes a plurality of distinct PMIC chips 204, which further include a first set of PMIC chips 204A and a second set of PMIC chips 204B. The first set of PMIC chips 204A are disposed on the first surface 202A of the substrate 202, e.g., jointly with all or a subset of remainder components of the SoC 120 distinct form the PMIC module 112. The second set of PMIC chips 204B are disposed on the second surface 202B of the substrate 202. A rail voltage outputted by the first set of PMIC chips 204A is routed on or under the first surface 202A, e.g., by way of a configurable power plane, to access a power rail 116 of the remainder components of the SoC 120. In some implementations, a rail voltage is outputted by the second set of PMIC chips 204B and routed vertically across the substrate 202, from the second surface 202B to the first surface 202A, to access an associated power rail 116 located on or under the first surface 202A, e.g., by way of a configurable power plane.

Figure 4A:
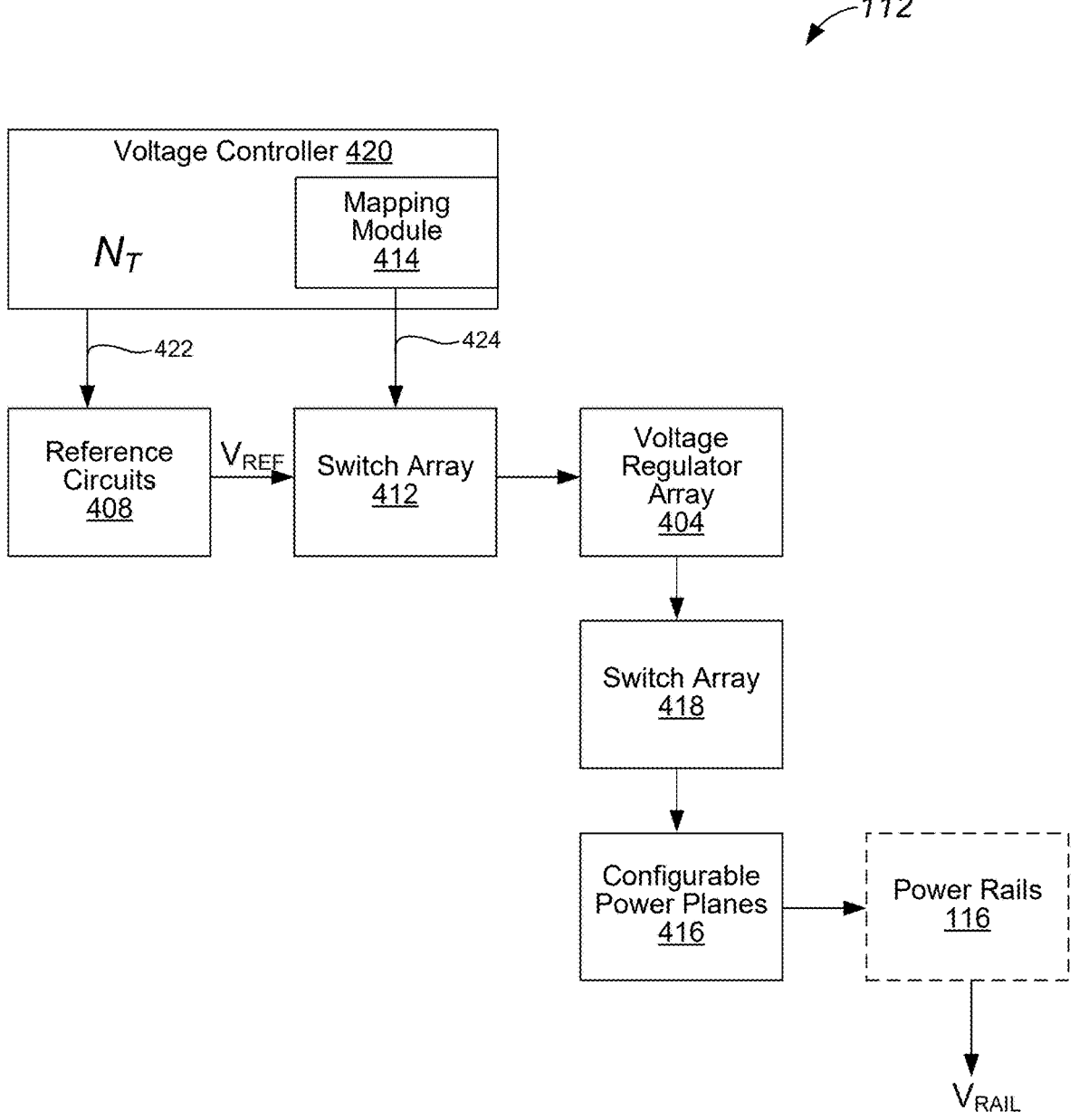
FIG. 4A is a high-level block diagram of an example PMIC module, in accordance with some implementations.
Figure 4B:
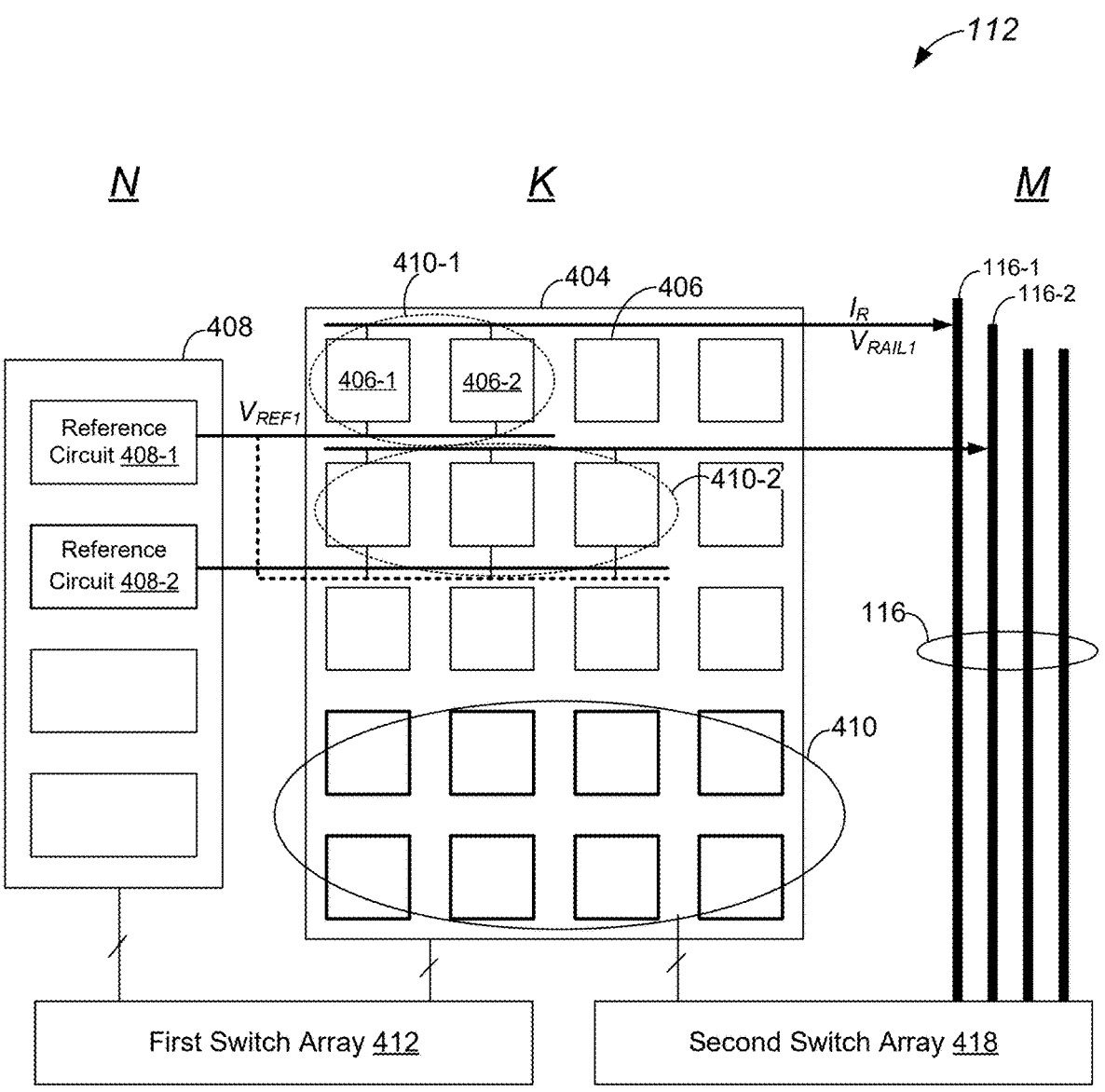
FIG. 4B is a detailed block diagram of an example PMIC module, in accordance with some implementations.

In some implementations, the PMIC module 112 includes a plurality of voltage regulator cells (e.g., voltage regulator cells 406 in FIG. 4B). In an example, a first PMIC chip 204-1 includes a subset of one or more respective voltage regulator cells (e.g., cell 406 in FIG. 4B), and is disposed immediately adjacent to an IO chip 206 including the I/O interface 106, allowing the I/O interface 106 to access a rail voltage provided by the subset of voltage regulator cells of the first PMIC chip 204-1. Alternatively, in some situations, two or more first PMIC chip 204-1 are disposed immediately adjacent to the IO chip 206 to provide the rail voltage to the IO chip 206 jointly. In another example, a memory chip 208 including one of the memory modules 104 is disposed on a location of the first surface 202A, and a second PMIC chip 204-2 is disposed a location of the second surface 202B aligned with (e.g., opposite to) the location of the first surface 202A. The second PMIC chip 204-2 includes a subset of one or more respective voltage regulator cells (e.g., cell 406 in FIG. 4B), and allows the one of the memory modules 104 to access a rail voltage provided by the respective voltage regulator cells vertically. By these means, a component of the SoC 120 may access its associated voltage regulator cell(s) located on a respective PMIC chip 204 that is disposed in proximity to the component without introducing an extended length to access a power rail 116, which helps reduce resistive and capacitive parasitics of the power rail 116 and enhance performance of the SoC 120.

Figures 3A, 3B:
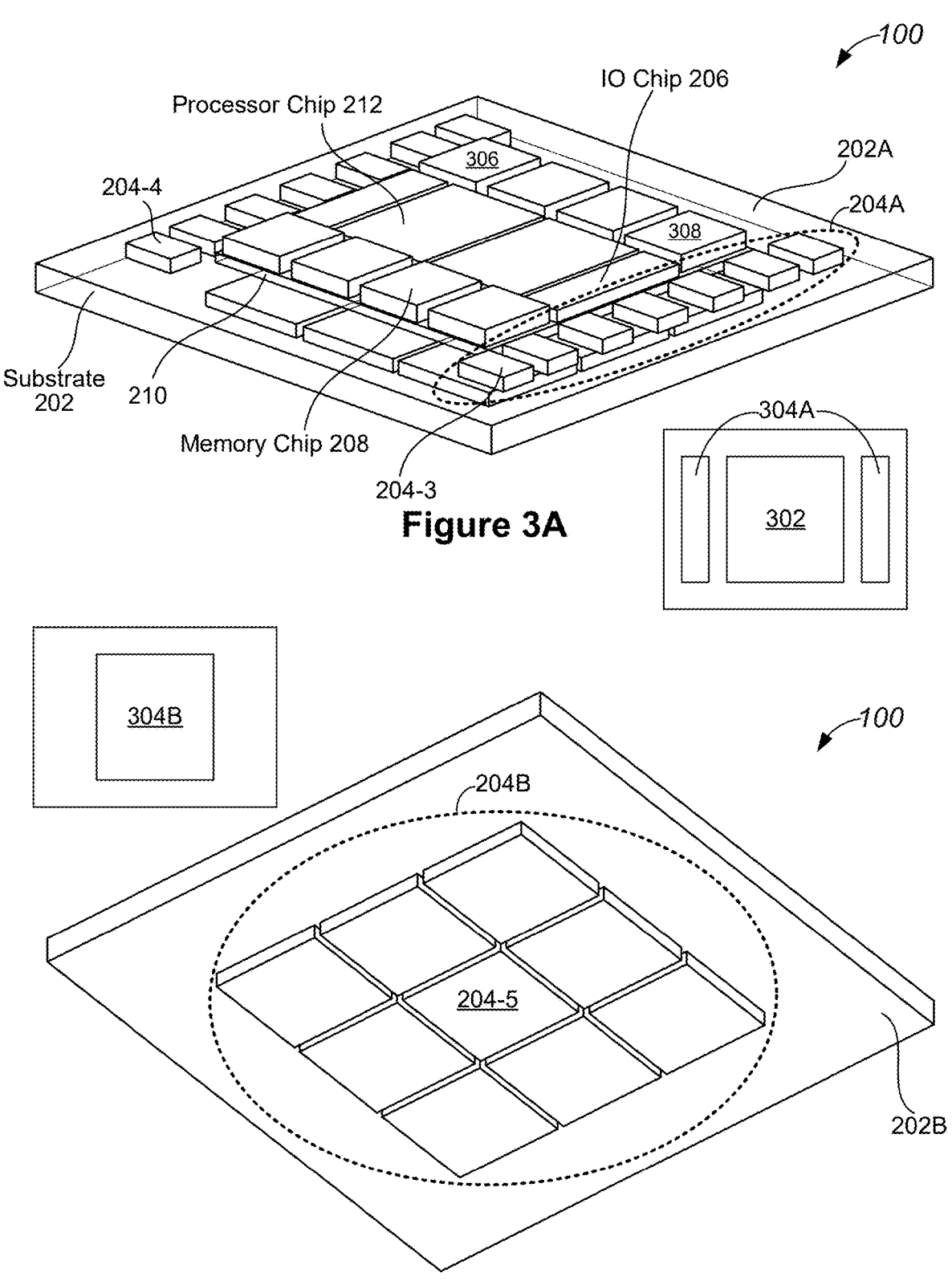
FIGS. 3A and 3B are a top perspective view and a bottom perspective view of another example electronic system, in accordance with some implementations, respectively.

FIGS. 3A and 3B are a top perspective view and a bottom perspective view of another example electronic system 100, in accordance with some implementations, respectively. In some implementations, the first surface 202A of the substrate 202 includes a device region 302 on which a plurality of component chips (e.g., processor chip 212, IO chip 206, memory chips 208) are disposed. One or more first PMIC regions 304A (e.g., two PMIC regions) are located adjacent to the device region 302, and a first set of PMIC chips 204A are disposed on the one or more PMIC regions 304A of the first surface 202A of the substrate 202. For example, two rows of PMIC chips 204A are disposed adjacent to two opposing sides of the device region 302. In another example not shown, four rows of PMIC chips 204A are disposed adjacent to four distinct sides of the device region 302, respectively.

In some implementations not shown, the second surface 202B of the substrate 202 includes an alternative device region on which one or more component chips (e.g., processor chip 212, IO chip 206, memory chips 208) are disposed and one or more PMIC regions on which a second set of PMIC chips 204B are disposed, independently of a chip arrangement of the first surface 202A. Alternatively, in some implementations (FIG. 3B), the second surface 202B of the substrate 202 includes a second PMIC region 304B. Referring to FIG. 3A, the perspective view of the integrated electronic system 100 is depicted from the top angle with a see-through effect (e.g., to see through the substrate 202). In some implementations, the second PMIC region 304B at least partially overlaps the device region 302, allowing a component chip mounted on the device region 302 to access an output of the second PMIC region 304B using a via (e.g., a through silicon via (TSV)).

In some implementations, centers of the second PMIC region 304A and the device region 302 are aligned with one another, i.e., a center of the second PMIC region 304A and a center of the device region 302 are directly opposite to one another on two opposing surfaces 202A and 202B of the substrate 202. Further, in some implementations, sizes of the second PMIC region 304A and the device region 302 are equal to each other. Alternatively, in some implementations, the sizes of the second PMIC region 304A and the device region 302 are different from each other. Alternatively, in some implementations, the second PMIC region 304A and the device region 302 are independent from one another in size and/or in position.

In other words, the PMIC module 112 includes a plurality of voltage regulator cells distributed in a subset of the plurality of PMIC chips 204. Each PMIC chip 204 is located at a respective position on the first surface 202A or the second surface 202B of the substrate 202. In some implementations, the plurality of voltage regulator cells is grouped based on their locations to provide a plurality of rail voltages to a plurality of power rails 116 coupled to different components of the SoC 120. More specifically, in some implementations, each power rail 116 coupled to a component (e.g., CPU chip, GPU chip, memory chip, IO chip) is coupled to a set of voltage regulator cells, which are selected based on their locations with respect to a location of the component. For example, the set of voltage regulator cells are the closest to the respective component in distance compared with a remainder of the voltage regulator cells, thereby controlling associated resistive and capacitive parasitics. In another example, the set of voltage regulator cells, which coupled to the respective component, provides the lowest parasitic level. Among two voltage regulator cells having equal distances form the respective component, a voltage regulator cell located on the first surface 202A is selected over a voltage regulator cell located on the second surface 202B. In some implementations, a voltage regulator cell located on the first surface 202A and having a larger distance from the respective component is selected over a voltage regulator cell located on the second surface 202B and having a smaller distance from the respective component.

In some implementations, the PMIC module 112 further includes a plurality of reference circuits (e.g., circuit 400 in FIGS. 4A and 4B). The plurality of reference circuits may be formed on the same PMIC chip 204 or distributed on two or more PMIC chips 204. For example, each PMIC region 304A or 304B includes at least one PMIC chip 204 (e.g., chips 204-3, 204-4, and 204-5) dedicated to providing one or more reference circuits. In another example, all of the plurality of reference circuits used within the voltage regulator cells of the PMIC module 112 are consolidated on a single PMIC chip (e.g., chip 204-5).

Alternatively, in some implementations, the plurality of reference circuits used with the voltage regulator cells of the PMIC module 112 are provided by a single chip 306 or distributed among a plurality of chips (e.g., chips 306 and 308), which are mounted on, or integrated in, the device region 302.

FIG. 4A is a high-level block diagram of an example PMIC module 112, in accordance with some implementations, and FIG. 4B is a detailed block diagram of an example PMIC module 112, in accordance with some implementations. The PMIC module 112 includes, or is coupled to, a plurality of power rails 116 configured to provide one or more rail voltages $V_{RAIL}$. The PMIC module 112 further includes an array 404 of voltage regulator cells 406 and a plurality of reference circuits 408. The plurality of reference circuits 408 are coupled to, but distinct from, the array 404 of voltage regulator cells 406. The array 404 of voltage regulator cells 406 is coupled to the plurality of power rails 116, and configured to provide a plurality of voltage regulator sets 410. Each voltage regulator set 410 is configured to output a respective rail voltage $V_{RAIL}$ to a respective power rail 116. Each of the plurality of reference circuits 408 is shared by, and configured to provide a respective reference voltage $V_{REF}$ to, one or more respective voltage regulator cells 406 of a respective voltage regulator set 410. The respective voltage regulator set 410 is configured to generate the respective rail voltage $V_{RAIL}$ based on the respective reference voltage $V_{REF}$.

Stated another way, some implementations of this application include a PMIC module 112 that has an array 404 of voltage regulator cells 406, a plurality of voltage references 408 that are selectable and programmable, and distribution circuits and buses that are selectable. Different numbers of voltage regulator cells 406 may be grouped together to form a voltage regulator set 410 for outputting a rail voltage $V_{RAIL}$ (also called a power supply voltage). The array 404 of voltage regulator cells 406 may be grouped to form a single voltage regulator set 410 or a plurality of power regulator sets 410, thereby providing a single rail voltage $V_{RAIL}$ or multiple rail voltages $V_{RAIL}$. In some implementations, the PMIC module 112 provides a plurality of rail voltages $V_{RAIL}$ correspond to a plurality of distinct voltage regulator sets 410, and each voltage regulator set 410 includes a respective number of voltage regulator cells 406, independently of other voltage regulator set(s) 410. For each voltage regulator set 410, outputs of the respective voltage regulator cells 406 are electrically coupled (e.g., shortened) to one another and further to a respective power rail 116. In some implementations, a voltage regulator set 410 is configured to output a variable rail voltage $V_{RAIL}$, e.g., to track a respective reference voltage $V_{REF}$.

In some implementations, the PMIC module 112 includes, or is coupled to, a single substrate (e.g., substrate 202 in FIGS. 2A and 2B). The array 404 of voltage regulator cells 406 and the plurality of reference circuits 408 are disposed on the substrate 202, separately from one another. In some implementations, the array 404 of voltage regulator cells 406 and the plurality of reference circuits 408 correspond to different sets of PMIC chips 204 disposed on PMIC regions 304A and 304B (FIGS. 3A and 3B) of the substrate 202. Alternatively, in some implementations, the array 404 of voltage regulator cells 406 is distributed in PMIC chips 204 disposed on the PMIC regions 304A and 304B of the substrate 202, and the plurality of reference circuits 408 correspond to chips (e.g., chip 306 or 308 in FIG. 3A) disposed on a device region 302 (FIG. 3A) of the substrate 202.

Referring to FIG. 4B, in some implementations, the plurality of power rails 116 include a first number M of power rails 116, and the plurality of reference circuits 408 include a second number N of reference circuits 408. The second number N is equal to or less than the first number M. Further, in some implementations, each reference circuit 408 and a respective power rail 116 is uniquely associated with each other, and the respective reference circuit 408 is configured to provide the respective reference voltage $V_{REF}$ to the respective voltage regulator cell set 410 assigned to generate the rail voltage $V_{RAIL}$ for the power rail 116. A number of voltage regulator cells 406 in the respective voltage regulator cell set 410 may be varied.

In some implementations, rail voltages $V_{RAIL}$ of two power rails 116-1 and 116-2 are equal to each other, and each power rail 116 maintains a consistent voltage. It is required that voltage regulator cells 406 contributing to each respective power rail 116-1 or 116-2 be driven by the same respective reference circuit 408. Further, in some implementations, two voltage regulator sets 410-1 and 410-2 corresponding to the two power rails 116-1 and 116-2 are coupled to two distinct reference circuits 408-1 and 408-2. Alternatively, in some implementations, the two voltage regulator sets 410-1 and 410-2 corresponding to the two power rails 116-1 and 116-2 are coupled to the same reference circuit 408 (e.g., 408-1). As such, the second number N of the reference circuits 408 is equal to or less than the first number M of the power rails 116.

In some implementations, the plurality of power rails 116 include a first number M of power rails 116, and the plurality of reference circuits 408 include a second number N of reference circuits 408. The array 404 of voltage regulator cells 406 includes a third number K of voltage regulator cells 406. The second number N is equal to or less than (≤) the third number K, and the first number M is equal to or less than (≤) the third number K.

In some implementations, the PMIC module 112 includes a first switch array 412 (e.g., having the second number N of rows and the third number K of columns, or the second number N of columns and the third number K of rows). For example, rows of the first switch array 412 are electrically coupled to the second number N of reference circuits 408, and columns of the first switch array 412 are electrically coupled to the third number K of voltage regulator cells 406 of the array 404. Each row-column cross section of the first switch array 412 includes a switch component configured to control coupling of a respective reference circuit 408 and a respective voltage regulator cell 406. For each voltage regulator set 410 (e.g., set 410-1 in FIG. 4B), a respective set of switch components of the first switch array 412 are enabled to couple the respective reference circuit 408 (e.g., circuit 408-1) to the one or more respective voltage regulator cells 406 (e.g., cells 406-1 and 406-2). Note that, in some implementations, lines connecting the reference circuits 408-1 and 408-2 directly to the voltage regulator cells 406 in the voltage regulator sets 410-1 and 410-2 may not correspond to interconnects and are drawn in FIG. 4B merely for illustrative purposes.

Referring back to FIG. 4A, in some implementations, the PMIC module 112 further includes a mapping module 414 coupled to the first switch array 412. The mapping module 414 is configured to control the switch components of the first switch array 412 to group the voltage regulator cells 406 to form the plurality of voltage regulator sets 410. More specifically, the mapping module 414 is configured to determine whether to enable or disable each of the switch components of the first switch array 412.

In some implementations, the PMIC module 112 further includes a plurality of configurable power planes 416 embedded in a module substrate of the PMIC module 112 or a substrate 202 to which the PMIC module 112 is mounted. Each of the plurality of power rails 116 is electrically coupled to a respective power plane 416, and extends to one or more electrical components (e.g., modules 102-108) to provide a respective rail voltage $V_{RAIL}$ to these components. Each output of voltage regulator cells 406 of a respective voltage regulator set 410 is also electrically coupled to the respective power plane 416, providing the power voltage $V_{RAIL}$ to the respective power plane 416.

Further, referring to FIG. 4B, in some implementations, the PMIC module 112 includes a second switch array 418 (e.g., having the first number M of rows and the third number K of columns, or the first number M of columns and the third number K of rows). For example, rows of the first switch array 412 are electrically coupled to the first number M of power rails 116 or configurable power planes 416, and columns of the second switch array 418 are electrically coupled to outputs of the third number K of voltage regulator cells 406 of the array 404. Each row-column cross section of the second switch array 418 includes a switch component configured to control coupling a respective voltage regulator cell 406 to a respective configurable power plane 416 or to a respective power rail 116. For each voltage regulator set 410 (e.g., set 410-1 in FIG. 4B), a respective set of switch components of the first switch array 412 are enabled to couple the one or more respective voltage regulator cells 406 (e.g., cells 406-1 and 406-2) to the a respective configurable power plane 416 or to the respective power rail 116 (e.g., rail 116-1). Additionally, in some implementations, the second switch array 418 and the first switch array 412 are integrated in a single switch array.

Note that, in some implementations, lines connecting the power rails 116-1 and 116-2 directly to the voltage regulator cells 406 in the voltage regulator sets 410-1 and 410-2 may not correspond to interconnects and are drawn in FIG. 4B merely for illustrative purposes.

In some implementations, the plurality of voltage regulator sets 410 include a first voltage regulator set 410-1 that is configured to output a first rail voltage $V_{RAIL1}$ (e.g., 1.2V, 0.8V) to a first power rail 116-1, and the first rail voltage is equal to a first reference voltage $V_{REF1}$ provided by a first reference circuit 408-1. Stated another way, an output voltage level of each voltage regulator set 410 is set by its associated reference voltage, and the voltage regulator set 410 is configured to track its associated reference voltage provided by a respective reference circuit 408.

Referring back to FIG. 4A, in some implementations, the PMIC module 112 further includes a voltage controller 420 coupled to the plurality of reference circuits 408. The voltage controller 420 is configured to generate a digital control signal 422 based on the first rail voltage associated with the first power rail 116-1 and provide the digital control signal 422 to the first reference circuit 408-1 defining the first reference voltage $V_{REF1}$. The first power rail 116-1 extends to one or more electrical components (e.g., modules 102-108) to provide the first rail voltage to these components. Characteristics of the first power rail 116-1 (e.g., rail current, rail voltage) are determined based on operation of the one or more electrical components. The first reference voltage of the first reference circuit 408-1 is further determined and set based on the characteristics of the first power rail 116-1. In some implementations, the plurality of reference circuits 408 are identical to one another. The digital control signal 422 determines magnitudes of the reference voltages $V_{REF}$ outputted by the plurality of reference circuits 408. Conversely, in some implementations, at least two of the plurality of reference circuits 408 are different from one another. In an example, each reference circuit 408 includes a digital-to-analog converter (DAC).

Additionally, in some implementations, the first voltage regulator set 410-1 further includes a target number $N_T$ (e.g., 2) of voltage regulator cells 406 and is configured to deliver up to a predefined rail current $I_{RAIL}$ to the first power rail 116-1. The target number $N_T$ is determined based on the predefined rail current $I_{RAIL}$, e.g., equal to the predefined rail current $I_{RAIL}$ divided by a regulator current $I_{VGC}$ that is deliverable by each voltage regulator cell 406. Additionally, in some implementations, the PMIC module 112 further includes a voltage controller 420 coupled to the array 404 of voltage regulator cells 406. The voltage controller 420 is configured to determine the target number $N_T$ based on the predefined rail current $I_{RAIL}$ associated with the first power rail 116-1, generate one or more select signals 424 based on the target number $N_T$, and provide the one or more select signals 424 to the array 404 of voltage regulator cells 406 to select the target number $N_T$ of voltage regulator cells 406 (e.g., cells 406-1 and 406-2) of the first voltage regulator 116-1. In some implementations, the mapping module 414 is part of the voltage controller 420.

In some implementations, voltage regulator cells 406 in the array 404 of voltage regulator cells 406 are identical to each other. An output voltage of each voltage regulator cell 406 is determined based on a respective reference voltage $V_{REF}$ received by the respective voltage regulator cell 406. The higher a rail current $I_{RAIL}$ of a power rail 116, the larger the target number $N_T$ of the voltage regulator cells 406 grouped to drive the power rail 116.

Conversely, in some implementations, at least two voltage regulator cells 406 in the array 404 of voltage regulator cells 406 are different from one another. For example, an output voltage of each voltage regulator cell 406 is determined based on a respective reference voltage $V_{REF}$ received by the respective voltage regulator cell 406. The two voltage regulator cells 406 may have different driving capabilities (e.g., different regulator currents). Different numbers of the two voltage regulator cells 406 may be selected and combined based on a rail current $I_{RAIL}$ associated with a power rail 116 and regulator currents $I_{VGC}$ of the two voltage regulator cells 406.

Figure 5:
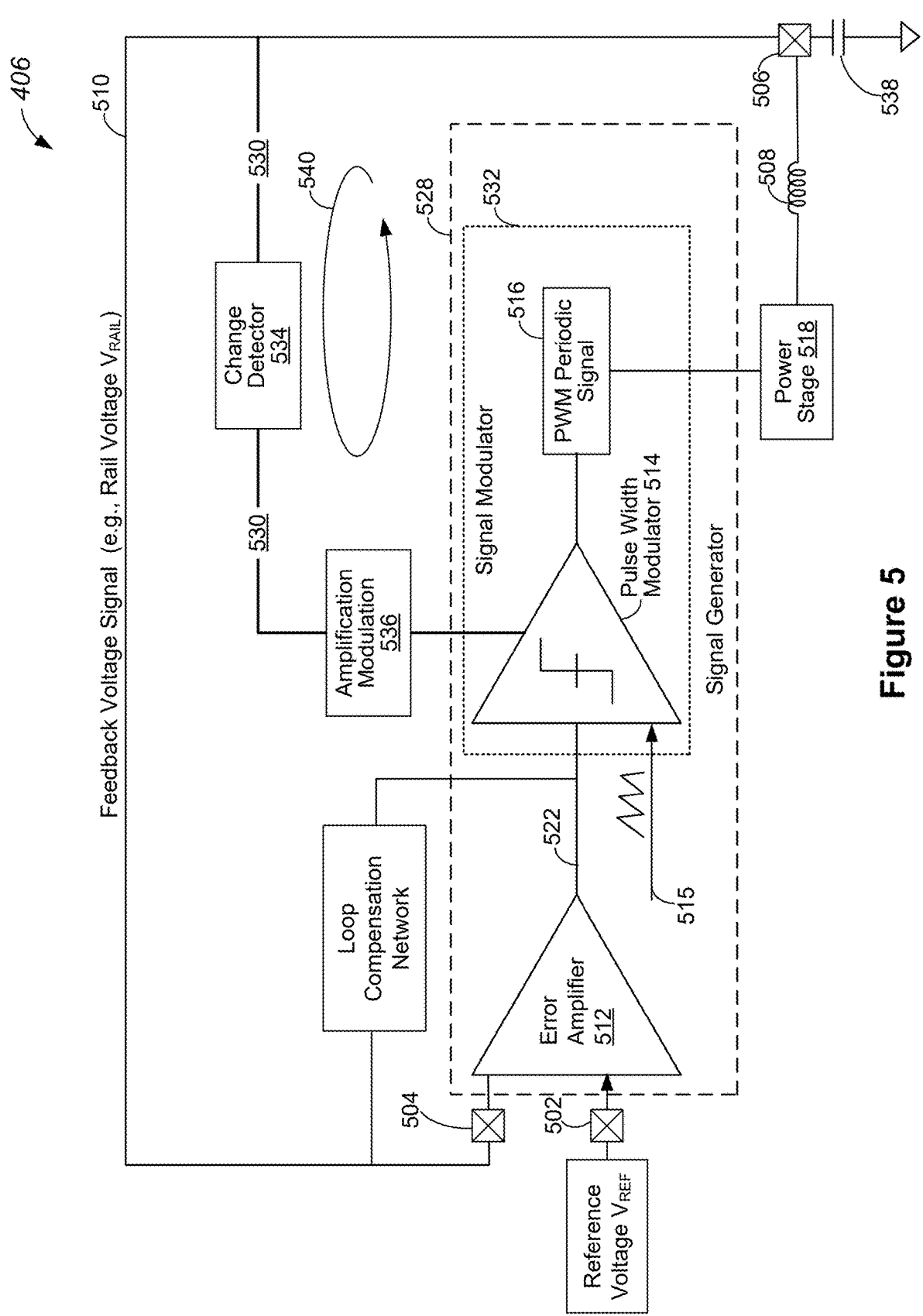
FIG. 5 is a schematic diagram of an example voltage regulator cell, in accordance with some implementations.

FIG. 5 is a schematic diagram of an example voltage regulator cell 406, in accordance with some implementations. In some implementations, the voltage regulator cell 406 includes an input reference interface 502 for receiving a target reference voltage $V_{REF}$, an input signal interface 504 for receiving an input signal (e.g., rail voltage $V_{RAIL}$), an output interface 506 for providing a rail voltage $V_{RAIL}$ to a power rail (e.g., power rail 116-1 in FIG. 4B), a first feedback path 510 coupling the output interface 506 of the voltage regulator cell 406 to the input signal interface 504 of the voltage regulator cell 406, and an inductor 508 electrically coupled between the input signal interface 504 and the output interface 506.

In some implementations, the voltage regulator cell 406 includes an error amplifier 512, a pulse width modulator 514, a power stage 518, and the feedback path 510. The error amplifier 512 is configured to receive a reference voltage $V_{REF}$ and a rail voltage $V_{RAIL}$ and generate an amplified difference signal 522. The pulse width modulator 514 is coupled to the error amplifier 512 configured to generate a pulse width modulated (PWM) periodic signal 516 having a pulse width and a feature frequency f. In an example, the pulse width modulator 514 includes a comparator, and receives an input signal 515 having a Sawtooth waveform or a triangular waveform. The pulse width modulator 514 is coupled to the error amplifier 512 and configured to modulate the pulse width of the input signal 515. The power stage 518 is coupled to the pulse width modulator 514 and configured to generate the rail voltage $V_{RAIL}$ based on the PWM periodic signal 516. In an example, the power stage 518 includes one or more power field effect transistors (FETs). The feedback path 510 is configured to couple an output of the power stage 518 to an input of the error amplifier 512, e.g., jointly with an inductor 508.

In some implementations, the voltage regulator cell 406 includes a signal generator 528, a power stage 518, and a first feedback path 510 coupling an output of the power stage to a signal input of the signal generator 528. The signal generator 528 is configured to receive a target reference voltage $V_{REF}$ and a rail voltage $V_{RAIL}$ and generate a PWM periodic signal 516 having a target pulse width. The power stage 518 is coupled to the signal generator 528 and configured to generate the rail voltage based on the PWM periodic signal 516 having the target pulse width. Further, in some implementations, in the voltage regulator cell 406, a second feedback path 530 couples the output of the power stage 518 to a signal modulator 532 of the signal generator 528. The second feedback path 530 is configured to pull the rail voltage $V_{RAIL}$ back to the target reference voltage $V_{REF}$ when the rail voltage $V_{RAIL}$ deviates from the target reference voltage $V_{REF}$ at a deviation rate higher than a characteristic circuit rate of the voltage regulator cell 406.

Further, in some implementations, the second feedback path 530 further includes a change detector 534 and an amplification and modulation circuit 536. The change detector 534 is coupled to the output of the power stage 518, and configured to detect the rail voltage $V_{RAIL}$ deviating from the target reference voltage $V_{REF}$ at the deviation rate. The amplification and modulation circuit 536 is coupled to the change detector 534 and the signal modulator 532, and configured to adjust a pulse width of the PWM periodic signal 516 in real-time, when the rail voltage $V_{RAIL}$ deviates from the target reference voltage $V_{REF}$ at the deviation rate. In other words, in some implementations, the change detector 534 is configured to sense fast voltage changes in the feedback voltage signal in the first feedback path 510 (e.g., corresponding to fast voltage changes in an output of the voltage regulator cell 406). The change detector 534 generates a modulation signal to modulate the signal modulator 532, thereby preventing an output of the voltage regulator cell 406 from deviating from the reference voltage $V_{REF}$.

State another way, in some implementations, the voltage regulator cell 406 is implemented based on a regulation control loop using one or more of a power stage 518, an integrated on-chip inductor 508, and a feedback voltage signal (e.g., carrying rail voltage $V_{RAIL}$ in a first feedback path 510). The regulation control loop tracks a difference between voltage feedback signal and the selected reference voltage $V_{REF}$, and generates pulse width modulated signals (e.g., PWM periodic signal 516) driving the power stage 518. The output of the power stage 518 may drive an integrated on-chip inductor 508.

In some implementations, an inductor 508 and an output filter capacitor 538 forms an output filter. The output filter may be part of, or external to, a respective voltage regulator cell 406. The output filter may partially belong to a respective voltage regulator cell 406. The output filter capacitor 538 may be embedded in a GPU or CPU package substrate, a substrate of the SoC 120 (e.g., substrate 202), or a processor chip 212 (FIG. 2A). In some implementations, for a voltage regulator set 410, output terminals of on-chip inductors 508 of voltage regulator cells 406 of the voltage regulator set 410 correspond to the output interface 506, and are coupled via interconnects to an output filter capacitor 538, which may be external to the voltage regulator cells 406. Stated another way, the voltage regulator cells 406 of the voltage regulator set 410 share, and is routed separately via the interconnects to, a common output filter capacitor 538. Further, in some implementations, the feedback voltage signal carried by the feedback path 510 is connected to the output filter capacitor via the interconnects extending external to the voltage regulator cells 406.

Additionally, in some implementations, a regulation control mechanism of a voltage regulator cell 406 employs dual control loops including the regulation control loop and a transient modulation loop 540. The regulation control loop is based on the first feedback path 510, and configured to modulate the PWM periodic signal 516 based on an error signal (e.g., amplified difference signal 522) generated by integrating a difference between the reference voltage $V_{REF}$ and the feedback voltage signal. In some implementations, the regulation control loop integrates a difference between the reference voltage $V_{REF}$ and the feedback voltage signal, and includes a signal modulator 532, which is shared with the transient modulation loop 540. The amplified difference signal 522 reflects integration of the difference between the reference voltage $V_{REF}$ and the feedback voltage signal, and is applied to modulate the PWM periodic signal 516 and generate a rail voltage $V_{RAIL}$ to be outputted at the output interface 506 of the voltage regulator cell 406. The rail voltage $V_{RAIL}$ settles at the associated reference voltage $V_{REF}$. Additionally, the transient modulation loop 540 is configured to modulate the PWM periodic signal 516 based on detection of transient characteristics of the feedback voltage signal (e.g., the rail voltage $V_{REF}$).

Figure 6:
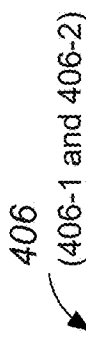
FIG. 6 is a conceptual diagram illustrating example two voltage regulator cells (also shown in FIG. 4B) for providing a rail voltage $V_{RAIL}$, in accordance with some implementations.

FIG. 6 is a conceptual diagram illustrating example two voltage regulator cells 406-1 and 406-2 (also shown in FIG. 4B) for providing a rail voltage $V_{RAIL}$, in accordance with some implementations. Each of the two voltage regulator cells 406-1 and 406-2 includes a respective inductor 508 electrically coupled to an output interface 506 of the respective voltage regulator cell 406. In some implementations, for each voltage regulator cell 406-1 or 406-2, the respective inductor 508 is integrated on chip, e.g., monolithically formed on a respective PMIC chip 204. In some implementations, a configurable power plane 416 is embedded in a module substrate of a PMIC module 112 or a substrate 202 of the SoC 120 to which a PMIC module 112 is mounted. The two voltage regulator cells 406-1 and 406-2 may be formed on a common chip substrate 602 or on two distinct chip substrates 602. The output interfaces 506 of the two voltage regulator cells 406-1 and 406-2 are electrically coupled to the power plane 416, which is further coupled to a power rail 116 (not shown on FIG. 6).

In some implementations, the inductor 508 is integrated on the cell substrate 602, e.g., above the signal generator 528, the power stage 518, and/or any other circuits 408, 412, 418, or 420 of the PMIC module 112. An input terminal of the inductor 508 is coupled to an output of the power stage 518, e.g., using a via, a metallic layer, a solder ball, a redistribution layer (RDL), or a combination thereof. In an example, an output terminal of the inductor 508 corresponds to an output of the inductor 508, and is connected to an interconnect that couples the inductor 508 to a bump or a solder ball of the PMIC module 112. The bump or solder ball is applied to electrically couple the PMIC module 112 to other electrical components (e.g., components 102-108) of an SoC 120. In some implementations, each of two terminals of the inductor 508 includes a respective interconnect made of a via, a metallic layer, an RDL, or a combination thereof, and is configured to provide a Kelvin sensing point.

Figure 7A:
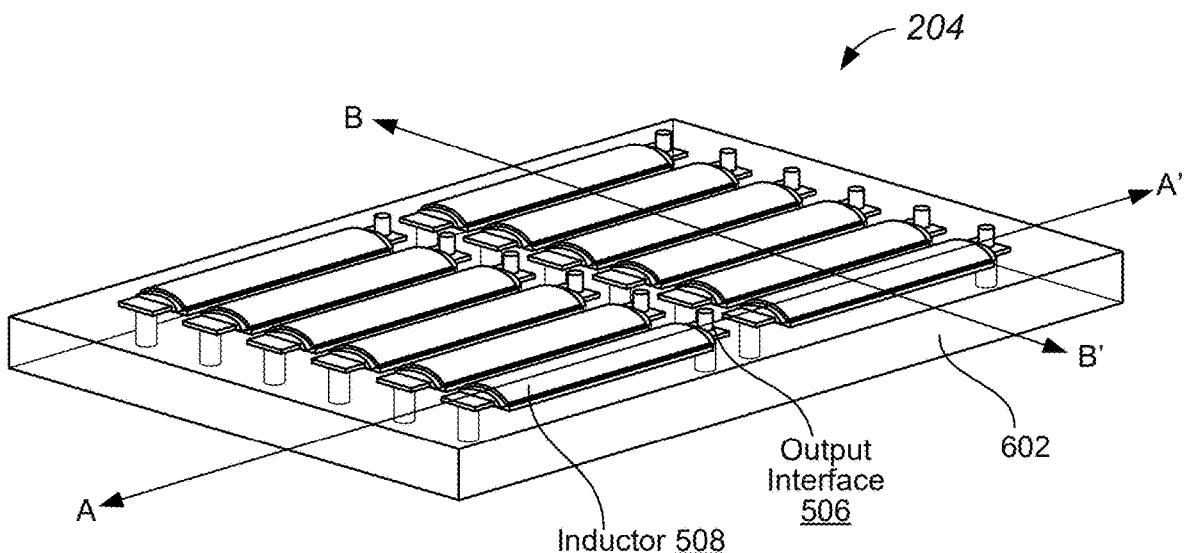
FIG. 7A is a perspective view of an example PMIC chip including a plurality of inductors coupled in a plurality of voltage regulator cells, in accordance with some implementations.
Figure 7C:
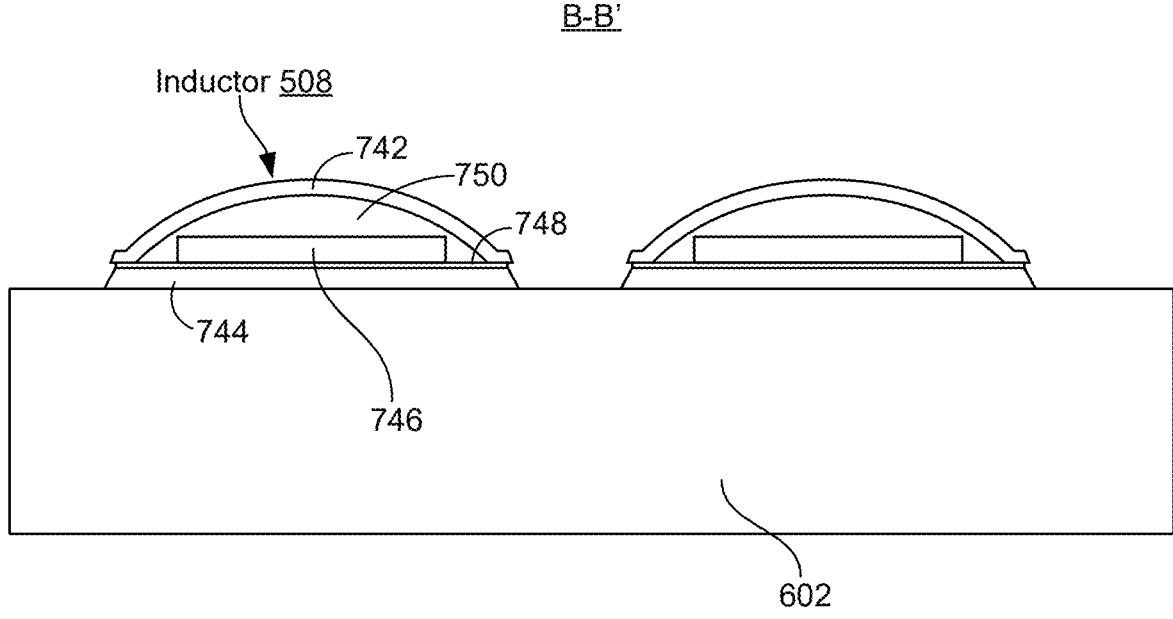

FIG. 7A is a perspective view of an example PMIC chip 204 including a plurality of inductors 508 coupled in a plurality of voltage regulator cells 406, in accordance with some implementations, and FIGS. 7B and 7C are two cross sectional views 720 and 740 of a portion of the PMIC chip 204 shown in FIG. 7A including two inductors 508 of two voltage regulator cells 406, in accordance with some implementations. The PMIC chip 204 has a chip substrate 602 and includes twelve voltage regulator cells 406 formed monolithically on a top surface of the chip substrate 602. Each voltage regulator cell 406 includes a respective inductor 508 integrated on the top surface of the chip substrate 602. Stated another way, the voltage regulator cells 406 (e.g., transistors and metal interconnects) may be formed on the cell substrate 602 and partially underneath the inductor 508. The PMIC chip 204 includes two cross sections AA' and BB' that are perpendicular to one another and to the top surface of the chip substrate 602. The cross section AA' is shown in FIG. 7B, and part of the cross section BB' is shown in FIG. 7C.

Referring to FIG. 7B, in some implementations, an inductor 508 includes three vias 722, 724, and 726. A first via 722 is coupled between an output a power stage 518) of a respective voltage regulator cell 406 to an input terminal 508A of the inductor 508, driving current toward the inductor 508. In some implementations, a second via 724 is coupled between an output terminal 508B of the respective inductor 508. The output terminal 508B of the respective inductor 508 corresponds to an output port 506 of the voltage regulator cell 406. Alternatively, in some implementations, the second via 724 is coupled between the output terminal 508B of the respective inductor 508 and an input signal interface 504 (FIG. 5). A third via 726 is coupled between the output terminal 508B of the inductor 508 and a power rail 116 powering other components (e.g., components 102-108 in FIG. 1) of an SoC 120, providing current and power to enable operations of the other components of the SoC 120. In some implementations, the third via 726 couples the output terminal 508B of the inductor 508 to the power rail 116 via a configurable power plane 416 (FIG. 6). In some implementations, the third via 726 is vertically aligned with the second via 724. In some implementations not shown, the third via 726 is laterally shifted (i.e., not vertically aligned) with respect to the second via 724.

In some embodiments, the first via 722 and the second via 724 enable Kelvin connections for sensing a current passing a conduction trace of the inductor 508. A current sensing circuit 728 is coupled to the input terminals 508A and the output terminal 508B of the inductor 508, and configured to measure a voltage drop on the inductor 508. Given that a resistance of the inductor 508 is known, the voltage drop is applied to determine a current passing through the inductor 508.

In some implementations, each of two terminals 508A and 508B of the inductor 508 includes a respective interconnect made of a via, a metallic layer, an RDL, or a combination thereof. The respective interconnect forms a Kelvin connection, which may be coupled to a current sensing circuit associated with the voltage regulator cell 406 for sensing an inductor current running through the inductor 508. In some implementations, a distance between Kelvin connections of each voltage regulator cell 406 is substantially uniform in the array 404 of voltage regulator cells 406 (e.g., in FIG. 7A). For each voltage regulator set 410, current balancing among different voltage regulator cells 406 is enabled using a single shared reference circuit 408.

Referring to FIG. 7C, in some implementations, the inductor 508 is formed on top of the cell substrate 602 (e.g., a silicon substrate), and include at least two laminated magnetic thin film layers 742 and 744 wrapping around a conductor 746. The inductor 508 further includes an insulation film layer 748 and a dielectric filling structure 750. The two laminated magnetic thin film layers 742 and 744 are electrically isolated from the conductor 746 by the insulation film layer 748 and a dielectric filling structure 750. In some implementations, there is no gap in an enclosure formed by the two laminated magnetic thin film layers 742 and 744. Conversely, in some implementations, there is a gap in the enclosure formed by the two laminated magnetic thin film layers 742 and 744. Further, in some implementations, each of the two laminated magnetic thin film layers 742 and 744 includes a stack of alternating magnetic thin films and dielectric thin films.

Figure 8A:
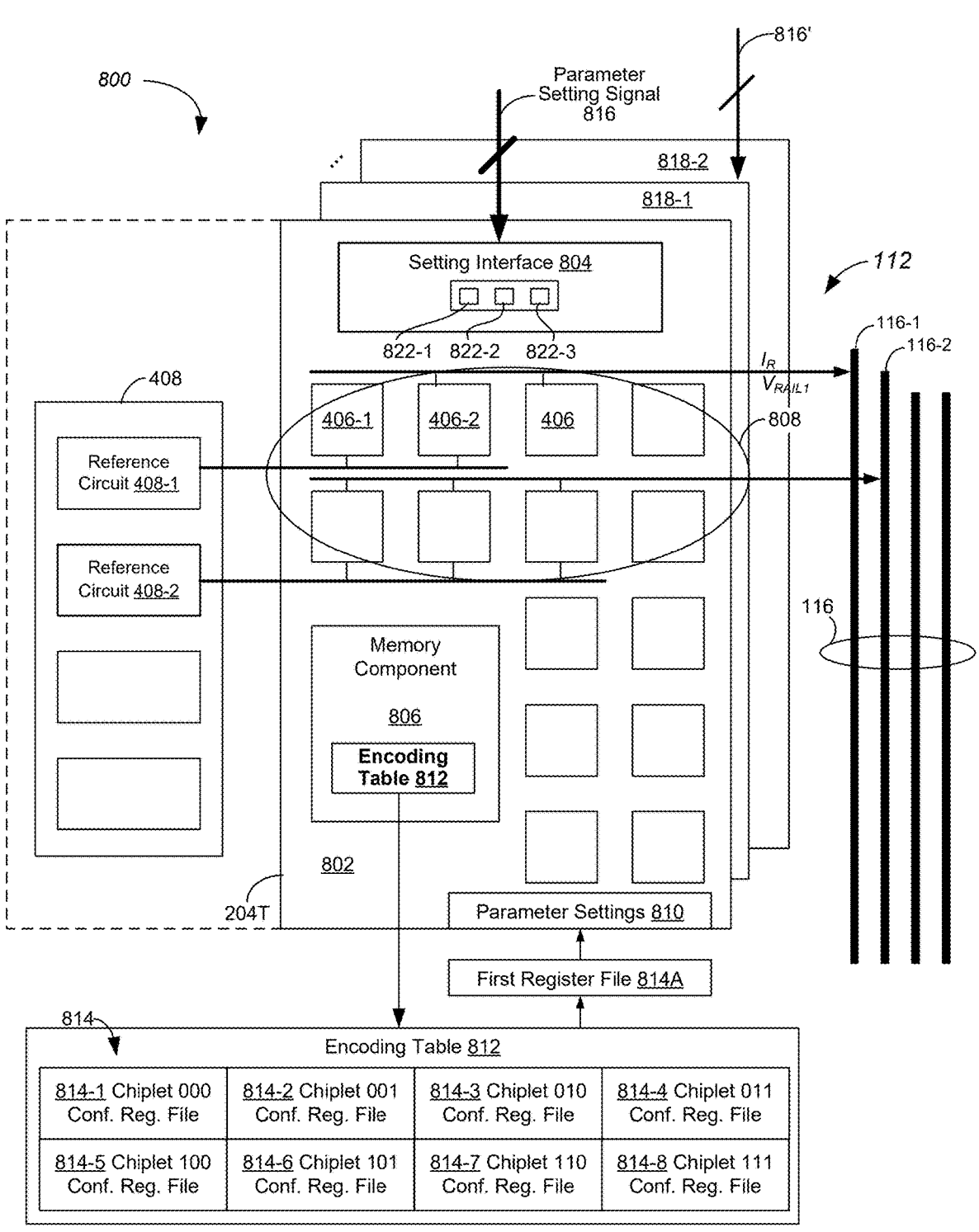
FIG. 8A is a block diagram of an example PMIC module that applies location-mapped parameter settings based on an encoding table, in accordance with some implementations.

FIG. 8A is a detailed block diagram of an example electronic device 800 that includes a PMIC module 112 implementing location-mapped parameter settings 810, in accordance with some implementations. The PMIC module 112 includes some or all of the components of the PMIC module 112 described with respect to FIGS. 4A and 4B. In some embodiments, the PMIC module 112 includes a plurality of PMIC chips 204 (e.g., chips 204-1, 204A, and 204B in FIGS. 2A and 2B). A plurality of voltage regulator cells 406 are distributed on the plurality of PMIC chips 204, and each of a subset of PMIC chips 204 includes a group of respective voltage regulator cells 406. For example, the substrate 802 corresponds to one of the plurality of PMIC chips 204 (e.g., a PMIC chiplet 204T) of the PMIC module 112, and The PMIC chiplet 204T includes at least a first group 808 of voltage regulator cells 406 and a setting interface 804, which are integrated on the substrate 802. A memory component 806 may be coupled to, or included in, the PMIC chiplet 204T. The first group 808 of voltage regulator cells 406 may include less than all voltage regulator cells 406 or all voltage regulator cells 406 of the PMIC chip 204T. In some embodiments, the first group 808 of voltage regulator cells 406 provide the voltage regulator set 410-1 (FIG. 4B) for driving a first power rail 116-1.

The first group 808 of voltage regulator cells 406 is configured to operate based on parameter settings 810 of individual voltage regulator cells 406 within the first group 808 of voltage regulator cells 406. Based on the parameter settings 810, the first group 808 of voltage regulator cells 406 is configured to output at least one respective rail voltage, and provide the at least one respective rail voltage to one or more power rails 116 (e.g., the power rail 116-1, the power rail 116-2, etc.). In some embodiments, the substrate 802 corresponds to a PMIC chip 204T, and is part of an SoC (e.g., a PMIC of the SoC).

In some embodiments, the memory component 806 stores an encoding table 812 that includes a plurality of register files 814 (e.g., a register file 814-1, a register file 814-2, etc.), where a first register file 814A (e.g., the register file 814-1) of the plurality of register files 814 defines parameter settings 810 for the individual voltage regulator cells of the first group 808 of voltage regulator cells 406. In some embodiments, the memory component 806 includes a memory chip 208 distinct from the substrate 802 of the PMIC chip 204T and the PMIC chip 204T obtains the encoding table 812 from the memory chip 208, which may provide the encoding table 812 to two or more PMIC chips 204. Alternatively, in some embodiments, each of a subset of PMIC chips 204 has a group of respective voltage regulator cells 406, and includes a distinct memory component 806 locally on a respective substrate 802.

In some embodiments, the setting interface 804 is coupled to the memory component 806 (e.g., physically coupled, communicatively coupled, etc.). The setting interface 804 is configured to receive a first parameter setting signal 816 applied to select the first register file 814A (e.g., a configuration register file 814-4) among the plurality of register files for defining the parameter settings 810 for the voltage regulator set 410-1. In some embodiments, the PMIC chiplet 204T is part of an SoC. The setting interface 804 is electrically coupled to (e.g., mate) a set of SOC pins (not shown) located on a substrate of the SoC, and configured to receive a first parameter setting signal 816 from the set of SOC pins. The set of SOC pins are electrically coupled based on a relative location in the SOC, thereby making the first parameter setting signal 816 depend on the relative location of the SoC pins (e.g., a location of the PMIC chiplet 204T) in the SoC.

In some implementations, the settings interface 804 includes a plurality of pins (e.g., a set of pins 822-1-822-3), and the first parameter setting provided by the parameter setting signal 816 includes a set of hardwired pin values, which are received via the plurality of pins and applied to select the first register file 814A for defining the parameter settings 810 for the first group 808 of voltage regulator cells 406 (e.g., one or more of the pins 822). In some implementations, the at least one respective rail voltage includes a first rail voltage (e.g., 5 V, 3.3 V or 1.8 V) provided by a first subset of voltage regulator cells in the first group 808 of voltage regulator cells 406, and output pins of the first subset of voltage regulator cells are electrically coupled to one another and to a first power rail 116-1.

The electronic device 800 includes a plurality of voltage references 408 configured to provide one or more reference voltages (e.g., a first reference voltage provided by the reference circuit 408-1) to the first group 808 of voltage regulator cells 406. The electronic device 800 also includes distribution circuitry including a plurality of switch components (e.g., first switch array 412 and second switch array 418 in FIG. 4B). In some implementations, the electronic device 800 includes a bus that is configured to communicatively couple the first group 808 of voltage regulator cells 406 (e.g., voltage regulator set 410-1) with a corresponding set of voltage references and a subset of distribution circuitry (e.g., first switch array 412 in FIG. 4B). In some embodiments, the plurality of voltage references 408 are provided by the same substrate 802 of the PMIC chiplet 204T including the first group 808 of voltage regulator cells 406. In some embodiments not shown, the plurality of voltage references 408 are provided by a substrate (e.g., substrate 818-1, 818-2) of a PMIC chiplet distinct from the PMIC chiplet 204T. In some embodiments not shown, the plurality of voltage references 408 are provided a substrate of a PMIC chiplet that is dedicated to voltage referencing. In some embodiments not shown, the plurality of voltage references 408 are distributed among a plurality of PMIC chiplets 204 that may or may not include the PMIC chiplet 204T.

In some implementation, the first group 808 of voltage regulator cells 406 is included in one of a plurality of individual chiplets, and each respective chiplet of the plurality of individual chiplets is electrically coupled to a same reference voltage. For example, cells 406-1 and 406-2 may be part of a first chiplet, and each of the respective cells may be coupled to the reference circuit 408-1 providing a same reference voltage.

In some implementations, the substrate 802 includes a first substrate of a plurality of substrates, and the plurality of substrates includes one or more second substrates (e.g., substrates 818-1 and 818-2). In some implementations, each respective second substrate of the plurality of substrates is associated with a respective set of pin values (e.g., pin values associated with the set of pins 822) that are received via a respective parameter setting signal 816' and applied to select a respective second register file in the encoding table 812 for defining respective parameter settings 810 for respective voltage regulator cells formed on the respective second substrate.

In some implementations, the parameter setting signal 816 corresponds to a location of the substrate 802 with respect to the electronic device 800 (e.g., a processor circuit) to which the substrate 802 is coupled or included, and is applied to select a particular register file based on the location of the substrate 802. In some implementations, the plurality of register files 814 and associated parameter settings correspond to a plurality of predefined locations for receiving the substrate 802 in the electronic device 800 (e.g., an SoC), and the parameter settings 810 defined for the individual voltage regulator cells of the first group 808 of voltage regulator cells 406 match on one of the plurality of predefined locations where the substrate 802 is disposed. In some embodiments, three distinct substrates 802, 818-1, and 818-2 have different chip locations in the electronic device 800, e.g., with reference to a processor module 102 powered by the PMIC module 112 (FIG. 1). Based on the chip locations, the register files 814-1, 814-2, and 814-3 are selected and applied to provide the parameter settings to the voltage regulator cells 406 formed on the substrates 802, 818-1, and 818-2, respectively.

Figure 8B:
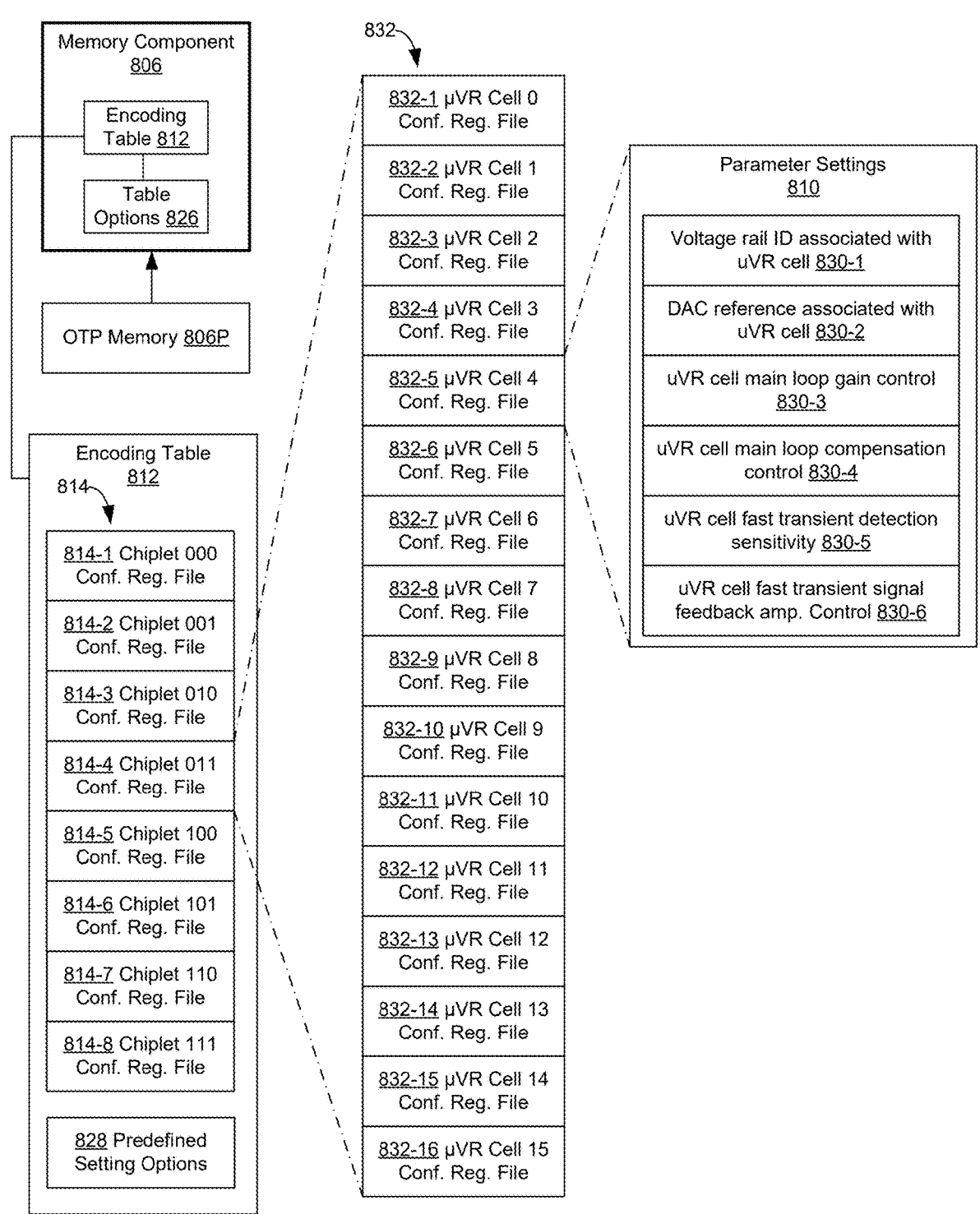
FIG. 8B is a detailed block diagram of an example encoding table of a PMIC module, in accordance with some implementations.

FIG. 8B is a block diagram of an example encoding table 812 of a PMIC module (e.g., PMIC module 112), in accordance with some implementations. In some embodiments, the memory component 806 stores a plurality of table options 826 including the encoding table 812. The table options 826 may be applied to different types of electronic devices, and the encoding table 812 is selected from the table options 826 based on identification information of the electronic device 800. In some embodiments, the memory component 806 is a nonvolatile programmable memory (e.g., a flash memory). For example, in some embodiments, the memory component 806 includes a one-time programmable (OTP) memory 806P. Further, in some embodiments, the OTP memory 806P is programmed with the table options 826 or only the encoding table 812. Alternatively, in some embodiments, the OTP memory 806P is programmed to store an encoding indicator, which is applied to select the encoding table 812 among the table options 826, and the table options 826 are stored in a non-volatile portion of the memory component 806. The memory component 806 may be included in the memory chip 208 or in the PMIC chip 204T.

In some implementations, at least one of the parameter settings 810 of the individual voltage regulator cells of the first group 808 of voltage regulator cells 406 includes an indicator referencing data from another portion of the encoding table 812, distinct from and shared by the plurality of voltage regulator cells 406. For example, the encoding table 812 includes a set of predefined settings options 828, which may be provided in conjunction with settings from the plurality of register files 814.

In some implementations, for the first group 808 of voltage regulator cells 406, at least one of the parameter settings 810 of the individual voltage regulator cells includes an indicator referencing data from another portion of the encoding table 812 distinct from and shared by the plurality of register files 814. For example, in some embodiments, a fast transient detection sensitivity 830 has four predefined sensitivity levels stored in the predefined settings options 828, and the first register file 814A uses an indicator (e.g., "0," "1," "2," and "3") to identify a respective sensitivity level used by the first register file 814 to set the first group 808 of voltage regulator cells 406.

In some implementations, each respective voltage regulator cell of the voltage regulation set 410-1 includes regulation control loop circuitry, one or more power stages (e.g., the power stage 518), one or more integrated on-chip inductors (e.g., on-chip inductor 508), and one or more voltage feedback signals (e.g., the voltage signal received on the feedback path 510). Each respective integrated on-chip inductor 508 of the one or more integrated on-chip inductors can be realized by two laminated magnetic thin film pieces surrounding (e.g., wrapping around) a single conductor. In some implementations, each on-chip inductor 508 has one terminal connecting with an output of power stage circuitry of the one or more power stages. In some embodiments, a connection is realized by vias, chip metal layers, and/or a redistribution layer (an RDL).

In some implementations, each respective integrated on-chip inductor 508 also has one output terminal, which has an outward interconnect to bumps or solder balls of the electronic device 800. In some embodiments, the bumps or solder balls are to form the joint connection between PMIC module 112 and an SoC of the electronic device 800. In some embodiments, the bumps or solder balls associated with the inductor 508 output terminals are to be connected to the terminal of the output filter capacitor.

In some implementations, each respective integrated on-chip inductor 508 also includes an inward interconnect (e.g., realized by vias, chip metal layers, an RDL), and the inward interconnect forms a Kelvin connection for sensing a respective current of the respective integrated on-chip inductor 508. In some implementations, the inward interconnect is connected to the current sensing circuitry associated with the corresponding voltage regulator cell associated with each respective on-chip inductor 508. In some implementation, a sensing distance between two Kelvin sensing contact points on each inductor 508 winding is maintained at a same (e.g., uniform) sensing distance (e.g., for all the integrated inductors 508 of the PMIC).

In some implementations, for a subset of voltage regulator cells of the first group 808 of voltage regulator cells 406, respective output terminals of the integrated on-chip inductors are connected to an output filter capacitor via interconnects outside of the electronic circuit. In some implementations, for the subset of voltage regulator cells, each respective voltage feedback signal is coupled to the output filter capacitor via an interconnect that is not integrated onto the electronic circuit (e.g., outside of the PMIC module 112). In some implementations, the one or more integrated on-chip inductors are fabricated over a footprint of their corresponding voltage regulator cell. More details on each cell 406 of the first group 808 of voltage regulator cells 406 and associated integrated on-chip inductors 508 are discussed above with reference to FIGS. 4A-7C.

In some implementations, the parameter settings 810 stored in the respective register files 814 include parameter settings for controlling the associated operations of electronic components of voltage regulator cells 406. For example, the parameter settings 810 include one or more of: (i) a voltage rail identifier (e.g., rail identifier 830-1); (ii) a DAC signal level (e.g., DAC reference 830-2); (iii) a loop gain parameter (main loop gain control 830-3); (iv) a compensation signal parameter (e.g., main loop compensation control 830-4); (v) a sensitivity parameter (e.g., fast transient detection sensitivity 830-5); and (vi) an amplification parameter (e.g., fast transient signal feedback amplification control 830-6).

In some implementations, each regulator cell 406 includes a regulation control loop circuitry configured to track a difference between a voltage feedback signal and a common voltage reference $V_{REF}$ selected for the respective voltage regulator cell, and generate, based on the tracked difference between the voltage feedback signal and the common voltage reference, pulse width modulated (PWM) signals driving power stages (e.g., one or more power stages 518). The reference voltage $V_{REF}$ and a gain of the regulation control loop circuit are set based on the parameter settings 810. In some implementations, a voltage regulator cell 406 includes a transient modulation loop 540 including an amplification and modulation circuit 536 configured for provide a fast transient signal feedback amplification control. The circuit 536 is set based on the amplification control 830-6 of the parameter settings 810 set based on the parameter setting signal 816.

In some embodiments, the parameter settings 810 of the first register file 814A are applied to set all voltage regulator cells of the first group 808 of voltage regulator cells 406. Alternatively, in some embodiments, the first register file 814A (e.g., selected form the register files 814-1 to 814-8) includes a plurality of cell register files 832 corresponding to individual voltage regulator cells 406 within the first group 808. For example, the first group 808 of voltage regulator cells 406 includes sixteen or more voltage regulator cells, and the first register file 814A includes sixteen cell register files 832. Each register file 832 may provide parameter settings 810 to one or more individual voltage regulator cells 406.

Figure 9A:
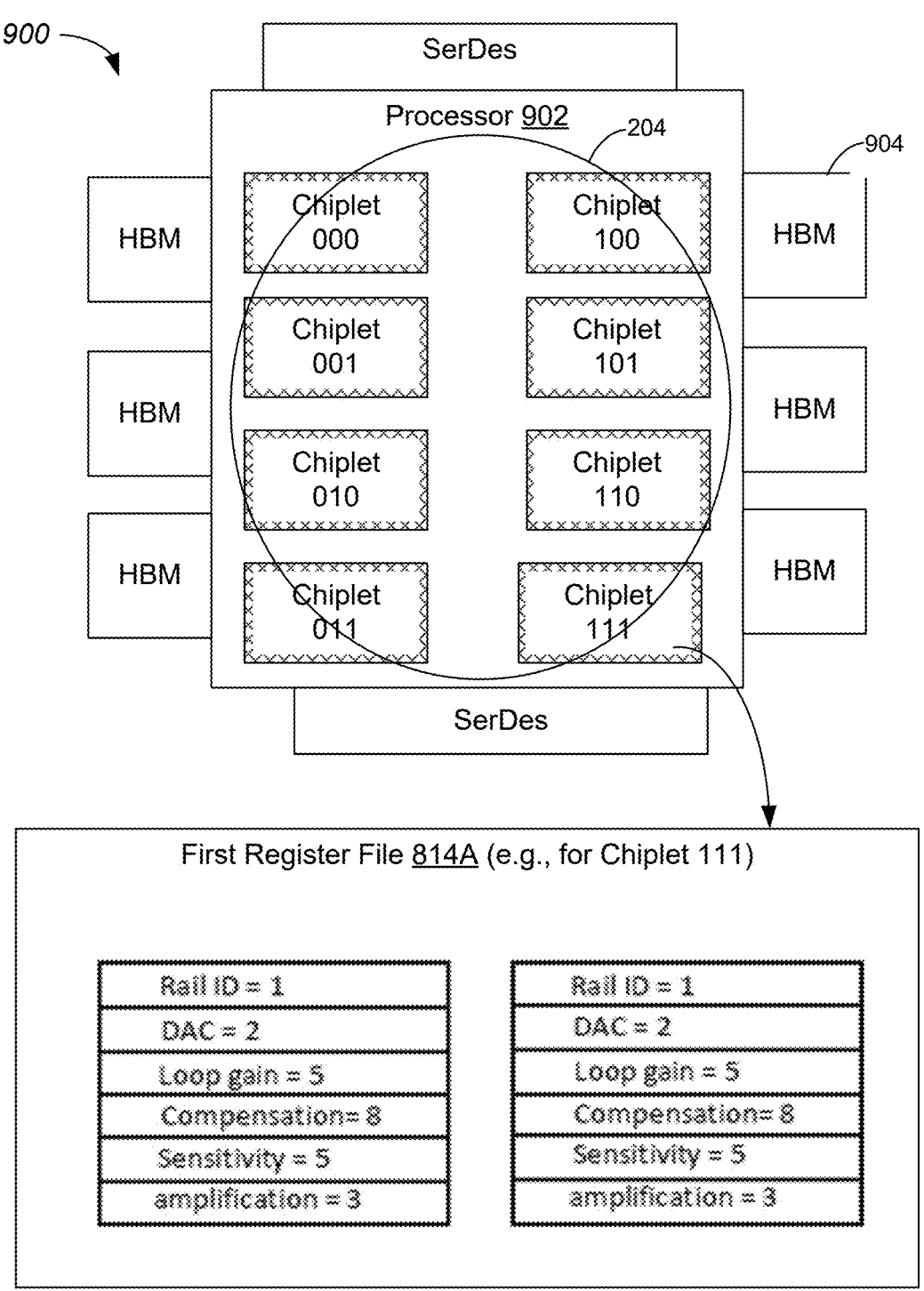

FIGS. 9A and 9B illustrate example electronic systems 900 and 950 and associated parameter settings 810 of voltage regulator cells 406, in accordance with some implementations. Each of the electronic systems 900 and 950 includes a different arrangement of chiplets of voltage regulator cells, as well as different associated parameter settings 810, which may be configured to correspond to a particular use case of the respective electronic circuits. As a prophetic example, the electronic system 900 includes a server using one or more artificial intelligence (AI) acceleration graphics processing units (GPUs) 902, and the electronic system 950 is an SoC for a personal computer. Though a skilled artisan will understand that many other use cases and configurations for the provided use cases are possible.

Referring to FIG. 9A, in some embodiments, the electronic system 900 includes a processor 902 (e.g., including the AI GPU(s)) and a plurality of PMIC chips 204 (e.g., eight PMIC chips) distributed at different locations with respect to the processor 902. An encoding table 812 is stored in a memory component 806 and includes a plurality of register files (e.g., files 814-1 to 814-8 in FIG. 8A) corresponding to the different locations of the PMIC chips 204. For example, the PMIC chips 204 include a chiplet 000, and a first register file 814A corresponding to the chiplet 000 is extracted from the encoding table 812 and applied to provide parameter settings 810 of individual voltage regulator cells 406 of the chiplet 000. In this example (FIG. 9A), the first group 808 of voltage regulator cells 406 of the chiplet 000 includes two voltage regulator cells 406 configured to provide a rail voltage jointly. These two voltage regulator cells 406 have the same parameter settings 810 (e.g., Rail ID=1, DAC=2, Loop gain=5, Compensation=8, Sensitivity=5, and Amplification=3). It is noted that, in some situations, each of the parameter settings 810 is defined by a respective indicator (e.g., "1," "2," "5") for selecting one of a set of predefined settings options 828 (FIG. 8B).

In some embodiments, the electronic system 900 includes one or more high bandwidth memories (HBMs) 904, which are coupled to the processor module 102 and/or the PMIC chips 204 by a serial communication bus. Further, in some embodiments, the memory component 806 stores the encoding table 812 is included in the HBMs 904. Alternatively, in some embodiments, the memory component 806 is integrated on the PMIC chips 204.

Referring to FIG. 9B, in some embodiments, the electronic system 950 includes a processor 902 having a plurality of distinct processor units (e.g., CPU 902C, GPU 902G, NPU 902N) and a plurality of PMIC chips 204 (e.g., three PMIC chips labelled as "Chiplet 000," "Chiplet 001," and "Chiplet 010") distributed at respective locations with respect to the processor 902. An encoding table 812 is stored in a memory component 806 and includes a plurality of register files (e.g., files 814-1 to 814-8 in FIG. 8A) corresponding to the different locations of the PMIC chips 204. For example, the PMIC chips 204 include a chiplet 000 and a chiplet 010, and two register files 906A and 906B corresponding to the chiplets 000 and 010 are extracted from the encoding table 812 and applied to provide parameter settings 810 of individual voltage regulator cells 406 of the chiplets 000 and 010. In this example (FIG. 9B), for the chiplet 000, the first group 808 of voltage regulator cells 406 includes two voltage regulator cells 406 configured to provide two distinct rail voltages (e.g., having two distinct rail identifications of "2" and "1"). These two voltage regulator cells 406 have the same parameter settings 810 for Loop Gain, but not for the other parameter settings (e.g., Compensation, Sensitivity, and Amplification).

In some embodiments, the parameter settings 810 of a voltage regulator cell 406 (e.g., "uVR cell 1" for the chiplet 010) are predefined. Conversely, in some embodiments, the parameter settings 810 of a voltage regulator cell 406 (e.g., "uVR cell 0" for the chiplet 010) are undefined or represented by a variable (e.g., "x"), and dynamically defined when the voltage regulator cell 406 is applied to drive a power rail 116.

FIG. 10 is a flow diagram of an example method 1000 for providing an PMIC module 112 including an array 404 of voltage regulator cells 406, which are configured to operate with location-based parameter settings 810, in accordance with some implementations. The method 1000 includes providing (operation 1002) a first group 808 of voltage regulator cells 406 formed on a substrate 802 and configured to operate based on parameter settings 810 of individual voltage regulator cells, output at least one respective rail voltage, and provide the at least one respective rail voltage to one or more power rails 116. The method 1000 includes providing (operation 1004) a memory component 806 coupled to the first group 808 of voltage regulator cells 406. The memory component 806 stores (operation 1006) an encoding table 812 including a plurality of register files 814, and a first register file 814A defines the parameter settings 810 for the individual voltage regulator cells of the first group 808 of voltage regulator cells 406. The method 1000 includes providing (operation 1008) a setting interface 804 coupled to the memory component 806. The settings interface 804 is configured to receive a first parameter setting signal 816 applied to select the first register file 814A among the plurality of register files 814 for defining the parameter settings 810 for the first group 808 of regulator cells 406, e.g., based on a location of the substrate 802. The first group 808 of voltage regulator cells 406 and the settings interface 804 are integrated (operation 1010) on the substrate 802. In some embodiments, the memory component 806 is integrated on the substrate 802 as well.

Figure 11:
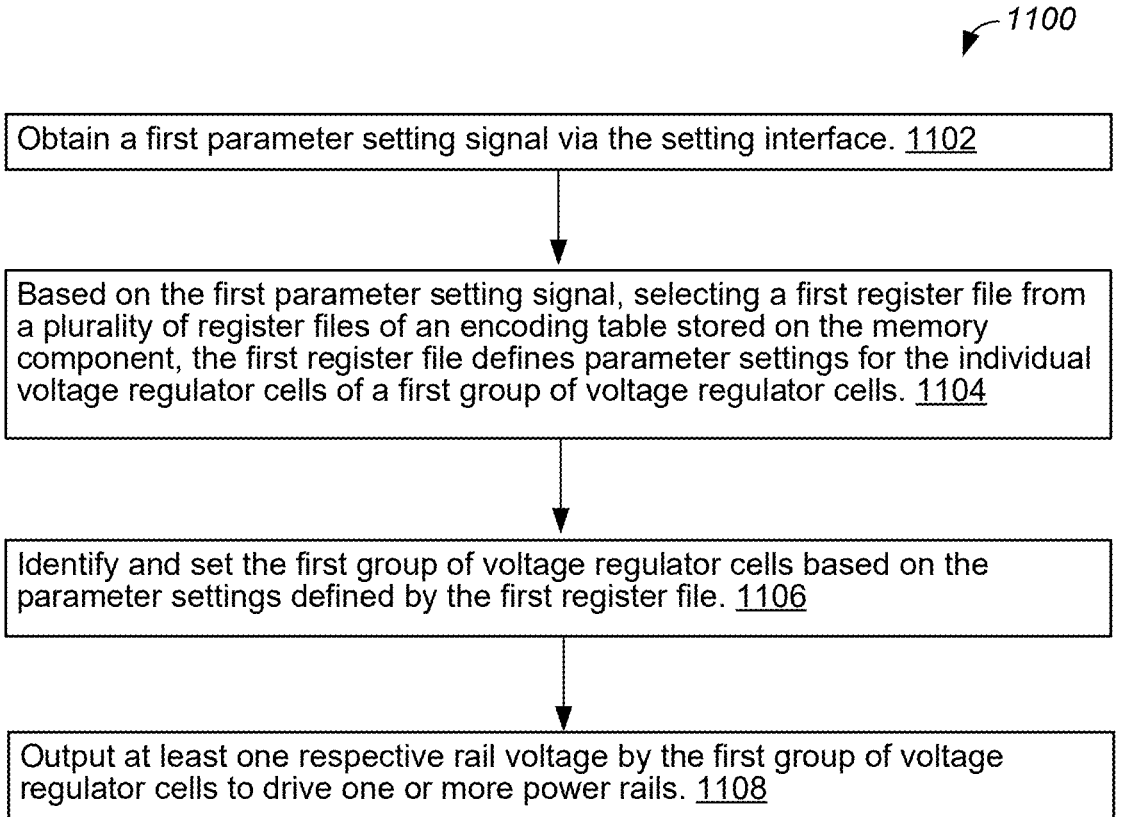
FIG. 11 is a flow diagram of an example method for managing power of an electronic device, In some embodiments.

FIG. 11 is a flow diagram of an example method 1100 for managing power of an electronic device, In some embodiments. The electronic device (specifically, a PMIC module 112) has a substrate 802, a memory component 806, a setting interface 804, and a plurality of voltage regulator cells 406. The substrate 802 corresponds to a PMIC chip 204, and a first group 808 of voltage regulator cells 406 and the settings interface 804 are integrated on the substrate 802. The memory component 806 stores an encoding table 812 including a plurality of register files 814. In an example, the memory component 806 may be part of a memory chip 208. In another example, the memory component 806 may be part of the substrate 406. A first parameter setting signal 816 is received (operation 1102) by the PMIC chip 204 via the setting interface 804. Based on the first parameter setting signal 816, a first register file 814A is selected (operation 1104) from the plurality of register files 814 of the encoding table 812 stored on the memory component 806. The first register file 814A defines parameter settings 810 for the individual voltage regulator cells of the first group 808 of voltage regulator cells 406. The first group 808 of voltage regulator cells 406 are identified and set (operation 1104) based on the parameter settings 810 defined by the first register file 814A. After the first group 808 of voltage regulator cells 406 are set with the parameter settings 810 of the first register file 814A, the first group 808 of voltage regulator cells 406 generates (operation 1108) at least one respective rail voltage $V_{RAIL}$ to drive one or more power rails 116.

Each of the above identified elements may be stored in one or more memory devices, and corresponds to a set of instructions for performing a function described above. The above identified modules or programs (i.e., sets of instructions) need not be implemented as separate software or firmware programs, procedures, modules or data structures, and thus various subsets of these modules may be combined or otherwise re-arranged in various implementations. In some implementations, the memory, optionally, stores a subset of the modules and data structures identified above. Furthermore, the memory, optionally, stores additional modules and data structures not described above.

Numerous examples of aspects of the disclosure are described as numbered clauses (1, 2, 3, etc.) for convenience. These are provided as examples, and do not limit the subject technology. Identifications of the figures and reference numbers are provided below merely as examples and for illustrative purposes, and the clauses are not limited by those identifications.

Clause 1. An electronic device, comprising: a first group of voltage regulator cells configured to operate based on parameter settings of individual voltage regulator cells, output at least one respective rail voltage, and provide the at least one respective rail voltage to one or more power rails; a memory component coupled to the first group of voltage regulator cells, wherein the memory component stores an encoding table including a plurality of register files, and a first register file defines parameter settings for the individual voltage regulator cells of the first group of voltage regulator cells; a setting interface coupled to the memory component, the setting interface configured to receive a first parameter setting signal applied to select the first register file among the plurality of register files for defining the parameter settings for the first group of voltage regulator cells; and a substrate on which the first group of voltage regulator cells and the setting interface are integrated.

Clause 2. The electronic device of clause 1, wherein for the first group of voltage regulator cells, at least one of the parameter settings of the individual voltage regulator cells includes an indicator referencing data from another portion of the encoding table distinct from and shared by the plurality of register files.

Clause 3. The electronic device of clause 1 or clause 2, further comprising: a plurality of voltage references configured to provide one or more reference voltages to the first group of voltage regulator cells; a distribution circuitry including a plurality of switch components; and a bus configured to communicatively couple the first group of voltage regulator cells with a corresponding set of voltage references and a subset of distribution circuitry.

Clause 4. The electronic device of any one of clause 1 to clause 3, wherein the substrate is part of a system-on-a-chip (SOC).

Clause 5. The electronic device of any one of clause 1 to clause 4, wherein the memory component stores a plurality of table options including the encoding table, and is a nonvolatile programmable memory, e.g., one-time programmable (OTP) memory, and the encoding table is selected based on data written in the nonvolatile programmable memory for setting at least the first group of voltage regulator cells based on power requirements of the one or more power rails.

Clause 6. The electronic device of any one of clause 1 to clause 5, wherein the setting interface includes a plurality of pins, and the first parameter setting signal includes a set of hardwired pin values, which are received via the plurality of pins and applied to select the first register file for defining the parameter settings for the first group of voltage regulator cells.

Clause 7. The electronic device of any one of clause 1 to clause 6, wherein the first parameter setting signal corresponds to a location of the substrate with respect to a processor circuit to which the substrate is coupled, and is applied to select the first register file of the plurality of register files based on the location of the substrate.

Clause 8. The electronic device of any one of clause 1 to clause 7, wherein the plurality of register files and associated parameter settings correspond to a plurality of predefined locations for receiving the substrate in an SoC, and the parameter settings defined for the individual voltage regulator cells of the first group of voltage regulator cells match on one of the plurality of predefined locations where the substrate is disposed.

Clause 9. The electronic device of any one of clause 1 to clause 8, wherein: the substrate includes a first substrate of a plurality of substrates; the plurality of substrates includes one or more second substrates; and each respective second substrate of the plurality of substrates is associated with a respective set of pin values that are received via a first parameter setting signal and applied to select a respective second register file in the encoding table for defining respective parameter settings for respective voltage regulator cells formed on the respective second substrate.

Clause 10. The electronic device of any one of clause 1 to clause 9, wherein the at least one respective rail voltage includes a first rai voltage provided by a first subset of voltage regulator cells in the first group of voltage regulator cells, and output pins of the first subset of voltage regulator cells are electrically coupled to one another and to a first power rail, when the electronic device is assembled in an electronic device.

Clause 11. The electronic device of any one of clause 1 to clause 10, wherein: the first group of voltage regulator cells is included in one of a plurality of individual chiplets, and the plurality of individual chiplets are electrically coupled to a set of common reference voltages.

Clause 12. The electronic device of clause 12, wherein the substrate includes a first substrate of the one of the plurality of individual chiplets, and the memory component is formed on an alternative substrate distinct from the first substrate, and wherein the alternative substrate corresponds to one of a PMIC chiplet, an SoC memory device, and a dedicated encoding table memory.

Clause 13. The electronic device of any of clauses 1-11, wherein the memory component is integrated on the substrate jointly with the first group of voltage regulator cells and the setting interface.

Clause 14. The electronic device of any one of clause 1 to clause 11, wherein: each respective voltage regulator cell of the first group of voltage regulator cells comprises: a regulation control loop circuitry, one or more power stages, one or more integrated on-chip inductors, and a voltage feedback signal; and for each of the respective voltage regulator cells, the parameter settings defined by the first register file includes one or more of: a DAC signal level; a loop gain parameter; a compensation signal parameter; a sensitivity parameter; and an amplification parameter.

Clause 15. The electronic device of clause 14, wherein: the regulation control loop circuitry is configured to: track a difference between the voltage feedback signal and a common voltage reference selected for the respective voltage regulator cell, and generate, based on the tracked difference between the voltage feedback signal and the common voltage reference, pulse width modulated (PWM) signals driving power stages.

Clause 16. The electronic device of clause 14 or 15, wherein the outputs of the one or more power stages drive the one or more integrated on-chip inductors, based on the amplification parameter received with the parameter setting signal.

Clause 17. The electronic device of any one of clause 14 to clause 16, wherein, for a subset of voltage regulator cells of the first group of voltage regulator cells: respective output terminals of the integrated on-chip inductors are connected to an output filter capacitor via interconnects.

Clause 18. The electronic device of clause 17, wherein, for the subset of voltage regulator cells, each respective voltage feedback signal is coupled to the output filter capacitor via an interconnect that is not integrated on the substrate.

Clause 19. The electronic device of any one of clause 14 to clause 18, wherein each respective integrated on-chip inductor of the one or more integrated on-chip inductors is realized by two laminated magnetic thin film pieces surrounding a single conductor.

Clause 20. The electronic device of any one of clause 14 to clause 19, wherein each on-chip inductor has one terminal connecting with an output of power stage circuitry of the one or more power stages.

Clause 21. The electronic device of any one of clause 14 to clause 20, wherein each respective integrated on-chip inductor also has one output terminal, which has an outward interconnect to bumps or solder balls of the electronic device.

Clause 22. The electronic device of any one of clause 14 to clause 21, wherein each respective integrated on-chip inductor also has an inward interconnect, and the inward interconnect forms a Kelvin connection for sensing a respective current of the respective integrated on-chip inductor.

Clause 23. The electronic device of any one of clause 14 to clause 22, wherein a sensing distance between two Kelvin sensing contact points on each inductor winding is maintained at a same sensing distance.

Clause 24. The electronic device of any one of clause 14 to clause 23, wherein the one or more integrated on-chip inductors are fabricated over a footprint of their corresponding voltage regulator cell.

Clause 25. A power management integrated circuit (PMIC), comprising: a first group of voltage regulator cells configured to operate based on parameter settings of individual voltage regulator cells, output at least one respective rail voltage, and provide the at least one respective rail voltage to one or more power rails; a memory component coupled to the first group of voltage regulator cells, wherein the memory component stores an encoding table including a plurality of register files, and a first register file defines the parameter settings for the individual voltage regulator cells of the first group of voltage regulator cells; a settings interface coupled to the memory component, the setting interface configured to receive a first parameter setting signal applied to select the first register file among the plurality of register files for defining the parameter settings for the first group of voltage regulator cells; and a substrate on which the first group of voltage regulator cells, the settings interface, and the memory component are integrated.

Clause 26. A method, comprising: providing a first group of voltage regulator cells on a substrate of an electronic circuit, the first group of voltage regulator cells configured to operate based on parameter settings of individual voltage regulator cells, output at least one respective rail voltage, and provide the at least one respective rail voltage to one or more power rails; providing a memory component coupled to the first group of voltage regulator cells, wherein the memory component stores an encoding table including a plurality of register files, and a first register file defines the parameter settings for the individual voltage regulator cells of the first group of voltage regulator cells; coupling a setting interface to the memory component, the settings interface configured to receive a first parameter setting signal applied to select the first register file among the plurality of register files for defining the parameter settings for the first group of regulator cells; and integrating the first group of voltage regulator cells, the settings interface, and the memory component on the substrate.

Clause 27, A method, comprising: at an electronic device having a substrate, a memory component, a setting interface, and a plurality of voltage regulator cells: obtaining a first parameter setting signal via the setting interface; based on the first parameter setting signal, selecting a first register file from a plurality of register files of an encoding table stored on the memory component, the first register file defines parameter settings for the individual voltage regulator cells of a first group of voltage regulator cells; identifying and setting the first group of voltage regulator cells based on the parameter settings defined by the first register file; and outputting at least one respective rail voltage by the first group of voltage regulator cells to drive one or more power rails; wherein the first group of voltage regulator cells, the settings interface, and the memory component are integrated on a substrate.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Additionally, it will be understood that, although the terms "first," "second," etc. may be used herein to describe various elements, these elements should not be limited by these terms. These terms are only used to distinguish one element from another.

It is known to one of those skilled in the art that "chip" and "chiplet" may be used in an exchangeable manner under some circumstances in this application.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific implementations. However, the illustrative discussions above are not intended to be exhaustive or to limit the claims to the precise forms disclosed. Many modifications and variations are possible in view of the above teachings. The implementations were chosen and described in order to best explain principles of operation and practical applications, to thereby enable others skilled in the art.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software, or any combination thereof.

What is claimed is:

1. An electronic device, comprising:
a first group of voltage regulator cells configured to operate based on parameter settings of individual voltage regulator cells, output at least one respective rail voltage, and provide the at least one respective rail voltage to one or more power rails;
a memory component coupled to the first group of voltage regulator cells, wherein the memory component stores an encoding table including a plurality of register files, and a first register file defines parameter settings for the individual voltage regulator cells of the first group of voltage regulator cells;
a setting interface coupled to the memory component, the setting interface configured to receive a first parameter setting signal applied to select the first register file among the plurality of register files for defining the parameter settings for the first group of voltage regulator cells; and
a substrate on which the first group of voltage regulator cells and the setting interface are integrated.

2. The electronic device of claim 1, wherein for the first group of voltage regulator cells, at least one of the parameter settings of the individual voltage regulator cells includes an indicator referencing data from another portion of the encoding table distinct from and shared by the plurality of register files.

3. The electronic device of claim 1, further comprising:
a plurality of voltage references configured to provide one or more reference voltages to the first group of voltage regulator cells;
a distribution circuitry including a plurality of switch components; and
a bus configured to communicatively couple the first group of voltage regulator cells with a corresponding set of voltage references and a subset of distribution circuitry.

4. The electronic device of claim 1, wherein the substrate is part of a system-on-a-chip (SOC), and the setting interface is electrically coupled to a set of SOC pins and configured to receive the first parameter setting signal from the set of SOC pins, and wherein the set of SOC pins are electrically coupled based on a relative location in the SOC.

5. The electronic device of claim 1, wherein the memory component stores a plurality of table options including the encoding table, and is a nonvolatile programmable memory, and the encoding table is selected based on data written in the nonvolatile programmable memory for setting at least the first group of voltage regulator cells based on power requirements of the one or more power rails.

6. The electronic device of claim 1, wherein the setting interface includes a plurality of pins, and the first parameter setting signal includes a set of hardwired pin values, which are received via the plurality of pins and applied to select the first register file for defining the parameter settings for the first group of voltage regulator cells.

7. The electronic device of claim 1, wherein the first parameter setting signal corresponds to a location of the substrate with respect to a processor circuit to which the substrate is coupled, and is applied to select the first register file of the plurality of register files based on the location of the substrate.

8. The electronic device of claim 1, wherein the plurality of register files and associated parameter settings correspond to a plurality of predefined locations for receiving the substrate in an SoC, and the parameter settings defined for the individual voltage regulator cells of the first group of voltage regulator cells match on one of the plurality of predefined locations where the substrate is disposed.

9. The electronic device of claim 1, wherein:
the substrate includes a first substrate of a plurality of substrates;
the plurality of substrates includes one or more second substrates; and
each respective second substrate of the plurality of substrates is associated with a respective set of pin values that are received via a respective parameter setting signal and applied to select a respective second register file in the encoding table for defining respective parameter settings for respective voltage regulator cells formed on the respective second substrate.

10. The electronic device of claim 1, wherein the at least one respective rail voltage includes a first rail voltage provided by a first subset of voltage regulator cells in the first group of voltage regulator cells, and output pins of the first subset of voltage regulator cells are electrically coupled to one another and to a first power rail.

11. The electronic device of claim 1, wherein the first group of voltage regulator cells is included in one of a plurality of individual chiplets, and the plurality of individual chiplets are electrically coupled to a set of common reference voltages.

12. The electronic device of claim 11, wherein the substrate includes a first substrate of the one of the plurality of individual chiplets, and the memory component is formed on an alternative substrate distinct from the first substrate, and wherein the alternative substrate corresponds to one of a PMIC chiplet, an SoC memory device, and a dedicated encoding table memory.

13. The electronic device of claim 1, wherein the memory component is integrated on the substrate jointly with the first group of voltage regulator cells and the setting interface.

14. The electronic device of claim 1, wherein:
each respective voltage regulator cell of the first group of voltage regulator cells comprises:
a regulation control loop circuitry, one or more power stages,
one or more integrated on-chip inductors, and
a voltage feedback signal; and
for each of the respective voltage regulator cells, the parameter settings defined by the first register file includes one or more of:
a DAC signal level;
a loop gain parameter;
a compensation signal parameter;
a sensitivity parameter; and
an amplification parameter.

15. The electronic device of claim 14, wherein:
the regulation control loop circuitry is configured to:
track a difference between the voltage feedback signal and a common voltage reference selected for the respective voltage regulator cell, and
generate, based on the tracked difference between the voltage feedback signal and the common voltage reference, pulse width modulated (PWM) signals driving power stages.

16. The electronic device of claim 14, wherein each respective integrated on-chip inductor of the one or more integrated on-chip inductors is realized by two laminated magnetic thin film pieces surrounding a single conductor, and each on-chip inductor has one terminal connecting with an output of power stage circuitry of the one or more power stages.

17. A power management integrated circuit (PMIC), comprising:
a first group of voltage regulator cells configured to operate based on parameter settings of individual voltage regulator cells, output at least one respective rail voltage, and provide the at least one respective rail voltage to one or more power rails;
a memory component coupled to the first group of voltage regulator cells, wherein the memory component stores an encoding table including a plurality of register files, and a first register file defines parameter settings for the individual voltage regulator cells of the first group of voltage regulator cells;
a settings interface coupled to the memory component, the setting interface configured to receive a first parameter setting signal applied to select the first register file among the plurality of register files for defining the parameter settings for the first group of voltage regulator cells; and
a substrate on which the first group of voltage regulator cells, the settings interface, and the memory component are integrated.

18. The PMIC circuit of claim 17, wherein the first parameter setting signal corresponds to a location of the substrate with respect to a processor circuit to which the substrate is coupled, and is applied to select the first register file of the plurality of register files based on the location of the substrate.

19. The PMIC circuit of claim 17, wherein the plurality of register files and associated parameter settings correspond to a plurality of predefined locations for receiving the substrate in an SoC, and the parameter settings defined for the individual voltage regulator cells of the first group of voltage regulator cells match on one of the plurality of predefined locations where the substrate is disposed.

20. A method, comprising:
at an electronic device having a substrate, a memory component, a setting interface, and a plurality of voltage regulator cells:

obtaining a first parameter setting signal via the setting interface;

based on the first parameter setting signal, selecting a first register file from a plurality of register files of an encoding table stored on the memory component, the first register file defines parameter settings for the individual voltage regulator cells of a first group of voltage regulator cells;

identifying and setting the first group of voltage regulator cells based on the parameter settings defined by the first register file; and outputting at least one respective rail voltage by the first group of voltage regulator cells to drive one or more power rails;

wherein the first group of voltage regulator cells and the settings interface are integrated on a substrate.

* * * * *